(12) United States Patent
Kobilka et al.

(10) Patent No.: US 11,059,723 B2
(45) Date of Patent: Jul. 13, 2021

(54) RENEWABLE FLAME-RETARDANT COMPOUNDS DERIVED FROM MUCONIC ACID

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 16/038,275

(22) Filed: Jul. 18, 2018

(65) Prior Publication Data

US 2020/0024141 A1    Jan. 23, 2020

(51) Int. Cl.
| | |
|---|---|
| *C01B 25/455* | (2006.01) |
| *C08K 5/092* | (2006.01) |
| *C08K 5/5333* | (2006.01) |
| *C08K 5/37* | (2006.01) |
| *C08L 63/00* | (2006.01) |

(52) U.S. Cl.
CPC ............ *C01B 25/455* (2013.01); *C08K 5/092* (2013.01); *C08K 5/37* (2013.01); *C08K 5/5333* (2013.01); *C08L 63/00* (2013.01); *C08L 2203/12* (2013.01)

(58) Field of Classification Search
CPC combination set(s) only.
See application file for complete search history.

(56) References Cited

U.S. PATENT DOCUMENTS

| | | | |
|---|---|---|---|
| 3,431,324 A | 3/1969 | Gillham et al. | |
| 3,526,613 A * | 9/1970 | Kraft | C08G 63/6924 558/78 |
| 8,426,639 B2 | 4/2013 | Frost et al. | |
| 8,809,583 B2 | 8/2014 | Bui et al. | |
| 9,023,925 B2 * | 5/2015 | Qi | C07F 9/657154 524/140 |
| 10,253,176 B2 * | 4/2019 | Negishi | C08L 23/06 |
| 2008/0214708 A1 * | 9/2008 | Bauer | C07F 9/301 524/147 |

OTHER PUBLICATIONS

SciFinder Results, "Derivative 1—reduced MA—Phosphate," printed Feb. 14, 2018, 2 pages.
SciFinder Results, "Derivative 1—reduced MA—Phosphinate," printed Feb. 14, 2018, 1 page.
SciFinder Results, "Derivative 2—hydrog-reduced—phosphinate," printed Feb. 14, 2018, 2 pages.
SciFinder Results, "Derivative 2—hydrog-reduced Phosphate," printed Feb. 14, 2018, 3 pages.
SciFinder Results, "Muconic Acid—Phosphate," printed Feb. 14, 2018, 2 pages.
SpecialChem, "Muconic Acid Market to Reach USD 86.54 Mn by 2020: TMR," SpecialChem, Industry News, Aug. 3, 2016, pp. 1-5. https://polymer-additives.specialchem.com/news/industry-news/tmr-foresees-muconic-acid-market-to-expand-by-2020-000183145).

* cited by examiner

*Primary Examiner* — Monique R Peets
(74) *Attorney, Agent, or Firm* — Kelsey M. Skodje

(57) ABSTRACT

A flame-retardant compound, a process for forming a flame-retardant polymer, and an article of manufacture are disclosed. The flame-retardant compound includes at least one muconic acid moiety and at least one phosphorus-based moiety. The process for forming the flame-retardant polymer includes obtaining a muconic acid compound, obtaining a muconic acid compound, reacting the muconic acid compound with the phosphorus compound to form a flame-retardant compound, and incorporating the flame-retardant compound into a polymer. The article of manufacture comprises a material that contains a flame-retardant compound derived from muconic acid.

4 Claims, 21 Drawing Sheets

200-2

230

240

250

302

352   3-Mercaptopropionate 356   2-Mercaptoethanol

360   Cysteamine HCl

M =

260   270

470

220, MgO
or
220, NEt$_3$

560

H$^+$

570

210, MgO
or
210, NEt$_3$

580

700 ↴

710

$x = 1, 2,$ or $3$

R =

306    or    307

RENEWABLE FLAME-RETARDANT COMPOUNDS DERIVED FROM MUCONIC ACID

BACKGROUND

The present disclosure relates to bio-renewable flame-retardant compounds and, more specifically, flame-retardant compounds derived from muconic acid.

Bio-based, sustainable compounds can be used in the syntheses of substances that previously required petroleum-based raw materials. For example, polymers used in plastics, artificial fibers, coatings, adhesives, and rubbers can be made from bio-based compounds. There are numerous strategies for efficiently and inexpensively producing bio-based compounds on an industrial scale. Examples of these strategies can be found in fermentation technologies, membrane technologies, and genetic engineering. Muconic acid (2E, 4E-hexa-2,4-dienedioic acid), is one example of a bio-based compound. Muconic acid is commonly produced by biological conversion of sugars and lignin-derived aromatic compounds.

SUMMARY

Various embodiments are directed to a flame-retardant compound. The flame-retardant compound can have at least one moiety derived from muconic acid and at least one phosphorus-based moiety. The phosphorus-based moiety can include an alkyl substituent and a functional group such as an epoxy functional group, an allyl functional group, or a propylene carbonate functional group. In some embodiments, the phosphorus-based moieties can include an alkyl substituent and a thioether substituent.

Additional embodiments are directed to a process of forming a flame-retardant polymer. The flame-retardant polymer can be produced by obtaining a phosphorus compound, obtaining a muconic acid compound, and reacting the phosphorus compound with the muconic acid compound to form a flame-retardant compound. The flame-retardant compound can then be incorporated into a polymer to form the flame-retardant polymer. The muconic acid compound can be obtained by reacting muconic acid that comes from a bio-based source to form a muconic acid derivative with at least one hydroxyl group. The flame-retardant compound can also be reacted with lithium bromide and carbon dioxide to form propylene carbonate functional groups, or with a thiol compound to form thioether-linked substituents. The flame-retardant compound can be incorporated into the polymer by blending, binding, or polymerization, wherein the polymerization may include at least one additional monomer.

Further embodiments are directed to an article of manufacture comprising a material that contains a flame-retardant compound derived from muconic acid. The article of manufacture can also contain an electronic component. The material containing the flame retardant muconic acid-based polymer can be a plastic for integrated circuit packing. The material can also be an epoxy resin, a polyhydroxyurethane, a polycarbonate, a polyester, a polyacrylate, a polyimide, a polyamide, a polyurea, or a poly(vinyl-ester). In some embodiments, the material is a polymer formed by polymerizing the flame-retardant compound. Additionally, the material can be a synthetic fiber.

DETAILED DESCRIPTION

Figure 1:
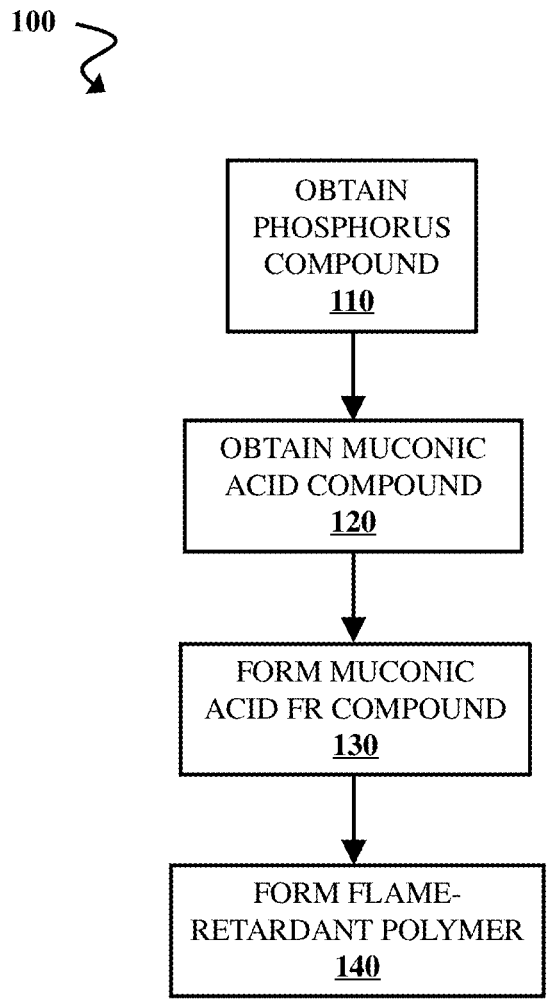
FIG. 1 is a flow diagram illustrating a process of forming a muconic acid-based flame retardant polymer, according to some embodiments of the present disclosure.

Bio-based compounds are increasingly being used in the syntheses of substances that previously required petroleum-based raw materials. One benefit of bio-based compounds is that they are from renewable resources. Therefore, these compounds have applications in sustainable, or "green," materials. Sustainable materials are becoming more and more prevalent due to the rising costs of fossil fuels and increasing environmental regulatory controls. Advances in biotechnology have provided numerous strategies for efficiently and inexpensively producing bio-based compounds on an industrial scale. Examples of these strategies can be found in fermentation technologies, membrane technologies, and genetic engineering. Biotechnological strategies can include plant-based and microorganism-based approaches. Plant-based approaches can involve obtaining a material directly from a plant, or growing plant tissues or cells that can produce bio-based compounds from various substrates using their own biosynthetic pathways. Microorganism-based approaches involve using native or genetically modified fungi, yeast, or bacteria to produce a desired compound from a structurally similar substrate.

Muconic acid (2E,4E-hexa-2,4-dienedioic acid) is an example of a bio-based compound that can have applications as a component of various polymers and small molecules. Muconic acid is a naturally occurring (e.g., as a metabolite) medium-chain fatty acid, though it can also be derived from other naturally occurring biomolecules (e.g., sorbic acid). On an industrial scale, muconic acid is commonly obtained via biological conversion of sugars and lignin-derived aromatic compounds. For example, cultures or cocultures of microorganisms such as *Escherichia coli* (*E. coli*) and *Saccharomyces cerevisiae* (*S. cerevisiae*) can be used to derive muconic acid from biomolecules such as glucose, salicylic acid, and glycerol. Muconic acid can also be derived from adipic acid.

Examples of uses for bio-based compounds include polymers, pharmaceuticals, food additives, and dyes. In some instances, bio-based polymers and petroleum-based polymers are blended to form a polymer composite. However, polymers can also be entirely bio-based, or produced from a combination of bio- and petroleum-based monomers. Examples of polymer applications include plastics, synthetic fibers, insulation, paints, coatings, foams, adhesives, and synthetic rubbers. Polymers can also be combined with additives. For example, flame-retardants blended into synthetic fibers that are required to comply with flame retardancy regulations (e.g., National Fire Protection Association (NFPA) 701 standards). These synthetic fibers are used in items such as clothing, acoustic dampening materials, cushioning, furniture, insulation, curtains, and carpets.

Additional examples of materials that can have flame-retardant additives include plastics, paints, coatings, foams, adhesives, and synthetic rubbers. These can be incorporated into devices with electronic components (e.g., printed circuit boards (PCBs), semiconductors, transistors, optoelectronics, capacitors, resistors, chip carriers, etc.). For example, resins for PCBs can be made flame retardant by incorporating polymers (e.g., epoxy resins, polyhydroxyurethane, polycarbonate, polyester, polyacrylate, polyimide, polyamide, polyurea, and/or poly(vinyl-ester) polymers) combined with flame-retardant compounds. This protects the PCBs from catching fire when exposed to high temperature environments or electrical power overloads. Further, flame-retardant plastics can be used for integrated circuit packages and other electronics hardware applications.

According to the present disclosure, flame-retardant compounds derived from muconic acid are formed, and used to produce a variety of flame-retardant polymers. Examples of these polymers are discussed in greater detail above. The muconic acid-derived flame-retardant compounds include small molecules, cross-linkers, monofunctional molecules, and monomers. These compounds can be added to polymers during blending, curing, foaming, extrusion, or other processing techniques in order to produce flame-retardant polymers. In some embodiments, the compounds are contained inside of microcapsules or nanocapsules, which are added to a polymer. In some embodiments, muconic acid-derived flame-retardant compounds can be polymerized alone or in combination with at least one additional class of monomers to form flame-retardant polymers.

FIG. 1 is a flow diagram illustrating a process 100 of forming muconic acid-based flame-retardant polymers, according to some embodiments of the present disclosure. Process 100 begins with the selection of a phosphorus-based flame-retardant compound. This is illustrated at step 110. Herein, the phosphorus-based flame-retardant compounds are referred to as "phosphorus compounds", unless otherwise specified. Each phosphorus compound includes at least one phosphorus-based moiety and at least one alkyl substituent and/or reactive functional group (e.g., substituents having reactive terminal functional groups, such as allyl, epoxy, amine, carboxylate, or hydroxyl groups). The phosphorus compounds can be synthesized as needed or obtained from commercial sources. The structures and syntheses of various phosphorus compounds are discussed in greater detail with respect to FIGS. 2A and 3A-3D.

Process 100 continues with the selection of a muconic acid compound. This is illustrated at step 120. This compound is selected from a variety of muconic acid compounds, which each have at least one hydroxyl and/or carboxylate group. Herein, "muconic acid compound" refers to either a compound derived from muconic acid or muconic acid itself. The muconic acid is produced by, and isolated from, organisms. Bio-based sources of muconic acid are discussed in greater detail above. In some embodiments, the other muconic acid compounds are derived directly or indirectly from muconic acid by synthetic processes. This is discussed in greater detail with respect to FIGS. 4A and 4B. However, the muconic acid compounds may be obtained from other sources (e.g., commercial sources or research institutions). It should be noted that the selection of a muconic acid compound in step 120 is illustrated as occurring after the obtainment of the phosphorus compounds in step 110. However, in some embodiments, step 120 can occur before step 110. Further, steps 110 and 120 may occur simultaneously.

The selected muconic acid compound and phosphorus compound are reacted to form a flame-retardant muconic acid compound. This is illustrated at step 130. Flame-retardant (FR) compounds derived from muconic acid are referred to herein as "muconic acid FR compounds". Examples of the syntheses and structures of these muconic acid FR compounds are discussed in greater detail with respect to FIGS. 5A-6C. The phosphorus compounds react with functional groups (e.g., carboxylate and/or hydroxyl groups) on the selected muconic acid compounds to provide phosphorus-based moieties (phosphoryl or phosphonyl) that impart flame retardant properties to the compound. The phosphorus-based moieties are discussed in greater detail with respect to FIG. 2A.

The muconic acid FR compounds formed in step 130 are incorporated into polymers, yielding flame-retardant polymers. This is illustrated at step 140. The muconic acid FR compounds can be incorporated into a polymer as small molecules, cross-linkers, or bound monofunctional molecules. Further, the muconic acid FR compounds can be polymerized to form muconic acid-based flame-retardant polymers. In some embodiments, the muconic acid FR compounds are polymerized in reactions with bases and/or additional monomers. Additionally, the muconic acid FR compounds may be polymerized in reactions with Ziegler-Natta catalysts. Polymerization reactions such as these are discussed in greater detail with respect to FIG. 9.

Figure 2A:
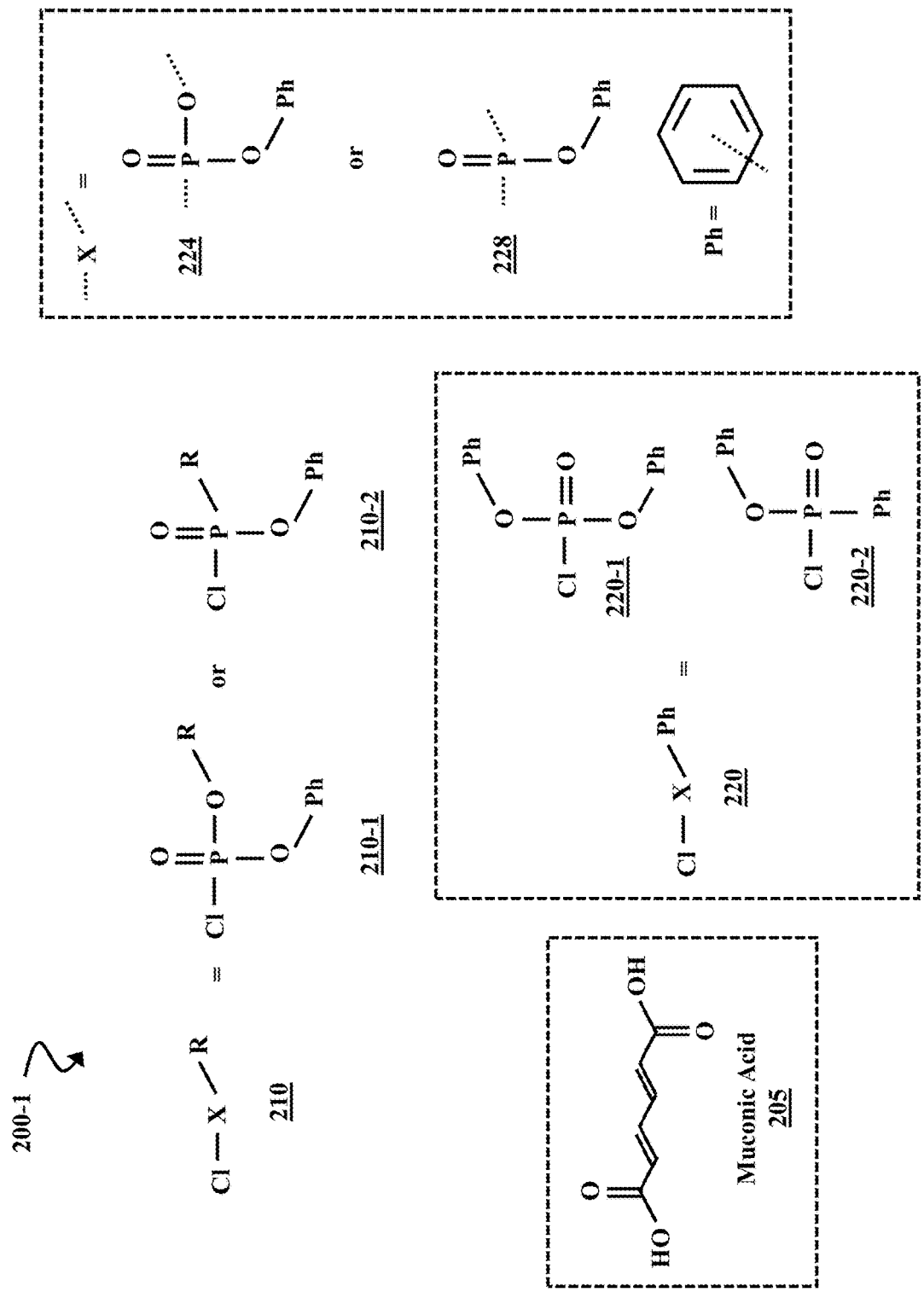
FIG. 2A is a chemical structure diagram illustrating structures of functionalized phosphorus compounds, Ph-substituted phosphorus compounds, and muconic acid, according to some embodiments of the present disclosure.

FIG. 2A is a chemical structure diagram illustrating structures 200-1 of functionalized phosphorus compounds 210-1 and 210-2 (referred to collectively as 210), phenyl (Ph)-substituted phosphorus compounds 220-1 and 220-2 (referred to collectively as 220), and muconic acid 205, according to some embodiments of the present disclosure. The isomer of muconic acid 205 illustrated in FIG. 2A is trans,trans-muconic acid. However, there are three isomers of muconic acid, which differ in geometry around the double bonds. These isomers are trans,trans-muconic acid, cis,trans-muconic acid, and cis,cis-muconic acid. Herein, "muconic acid" refers to trans,trans-muconic acid 205 unless otherwise specified. However, cis,trans-muconic acid and/or cis,cis-muconic acid may be used in some embodiments.

Each phosphorus compound is either a phosphate compound 210-1 and 220-1 or a phosphonate compound 210-2 and 220-2. The phosphate compounds 210-1 and 220-1 each have phosphoryl moieties 224, and the phosphonate compounds 210-2 and 220-2 each have phosphonyl moieties 228. Herein, "moiety" refers to any specified portion of a molecule that is not identified as a functional group (e.g., allyl and epoxy) or a substituent (e.g., Ph). To simplify the chemical structure diagrams illustrated herein, phosphoryl 224 and phosphonyl 228 moieties are represented by X. In some embodiments, each X moiety includes a Ph substituent. However, this Ph substituent can be replaced by another alkyl substituent (e.g., methyl, ethyl, propyl, isopropyl, butyl, tolyl, xylyl, naphthyl, etc.).

The Ph-substituted phosphorus compounds 220 each have an additional Ph or alternative alkyl substituent bound to their phosphoryl 224 or phosphonyl 228 moieties. In some embodiments, one or both of the Ph substituents are replaced by an alternative alkyl substituent (e.g., methyl, ethyl, propyl, isopropyl, butyl, tolyl, xylyl, naphthyl, etc.). The functionalized phosphorus compounds 210 each have an R functional group in addition to the Ph substituent on the phosphoryl 224 or phosphonyl 228 moiety. Example syntheses of the functionalized phosphorus compounds 210 are discussed with respect to FIGS. 3A and 3B. The phosphorus compounds 210 and 220 are reacted with muconic acid compounds to form muconic acid FR compounds.

Herein, muconic acid FR compounds are referred to as functionalized (monofunctionalized, difunctionalized, trifunctionalized, or polyfunctionalized) or Ph-substituted. Terminal functional groups (e.g., allyl, epoxy, propylene carbonate, amine, hydroxyl, carboxylate, etc.) on these compounds are involved in binding to polymer chains, or in polymerization reactions. The Ph substituents do not participate in these reactions. Therefore, compounds with at least one of these functional groups are referred to as functionalized in order to indicate that the compounds will participate in binding or polymerization. It should be noted that replacing a Ph substituent with another alkyl substituent can alter the properties of a muconic acid FR compound, and therefore a flame-retardant polymer, by influencing the size, shape, and polarity of the compound. Muconic acid FR compounds with only alkyl (e.g., Ph) substituents cause a polymer to be flame retardant when blended into the polymer.

Figure 2B:
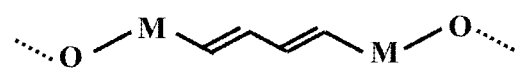
FIG. 2B is a chemical structure diagram illustrating structures of three moieties derived from muconic acid, according to some embodiments of the present disclosure.
Figure 2B:
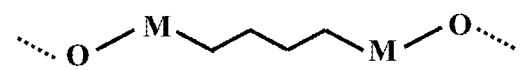
Figure 2B:
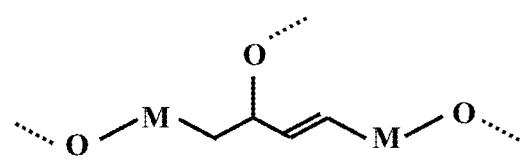
Figure 2B:
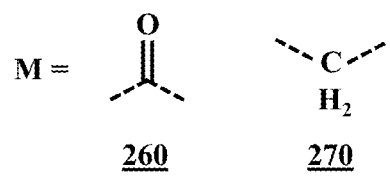

FIG. 2B is a chemical structure diagram illustrating structures 200-2 of three moieties derived from muconic acid 205, according to some embodiments of the present disclosure. The first moiety 230 in the group includes two carbon-carbon double bonds and two oxygen atoms, the second moiety 240 includes two oxygen atoms but no carbon-carbon double bonds, and the third moiety 250 includes one carbon-carbon double bond and three oxygen atoms. At least one moiety 230, 240, and/or 250 from this group is included in each of the muconic acid-based flame-retardant compounds herein. Each moiety 230, 240, and 250 has either two carbonyl functional groups 260 or two methylene bridge functional groups 270, which are represented by M. For example, muconic acid 205 includes the first moiety 230 with two carbonyl M groups 260. The dashed lines in each structure represent bonds to either phosphorus atoms in phosphoryl 224 or phosphonyl 228 moieties or hydrogen atoms. Examples of structures having these moieties 230, 240, and 250 are discussed in greater detail below.

Figure 3A:
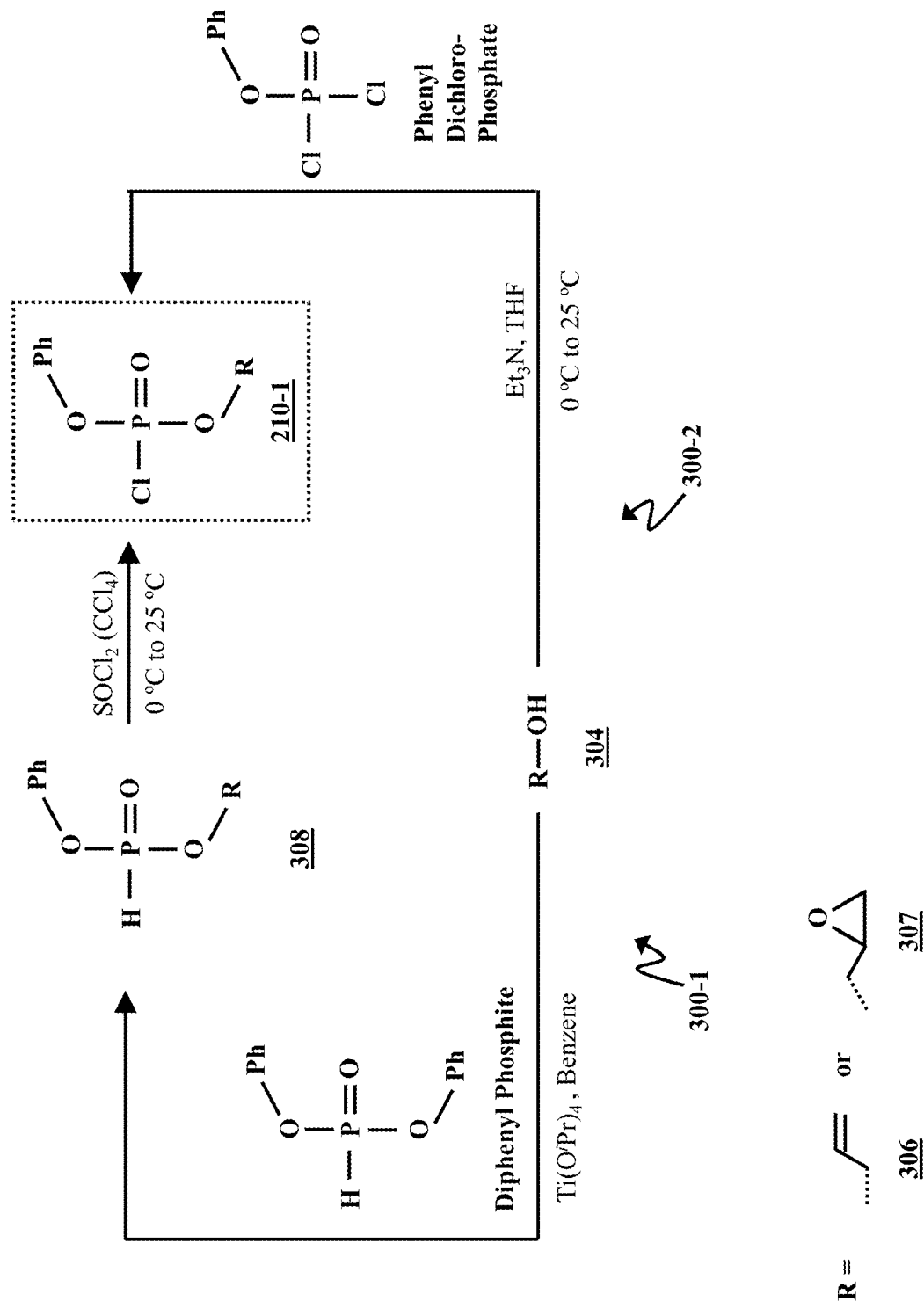
FIG. 3A is a chemical reaction diagram illustrating two processes of forming a functionalized phosphate compound, according to some embodiments of the present disclosure.

FIG. 3A is a chemical reaction diagram illustrating two processes 300-1 and 300-2 of synthesizing a functionalized phosphate compound 210-1, according to some embodiments of the present disclosure. In both processes 300-1 and 300-2, an alcohol 304 is a starting material for the functionalized phosphate compound 210-1. The alcohol 304 has either an allyl R group 306 or an epoxy R group 307. While the illustrated R groups 306 and 307 are each bound to a single methylene ($CH_2$) spacer group, other alcohols with chains of varying lengths (e.g., one to twelve $CH_2$ groups) could be used. Additionally, alcohols 304 with acrylate substituents are used in some embodiments.

In process 300-1, the alcohol 304 is reacted with diphenyl phosphite and titanium isopropoxide ($Ti(O^iPr)_4$) in benzene to produce a precursor 308 to the functionalized phosphate compound 210-1. In this pseudo-transesterification reaction, the precursor 308 is formed when a Ph substituent on diphenyl phosphite is replaced by the R group from the alcohol 304. The precursor 308 is then reacted with thionyl chloride ($SOCl_2$) and carbon tetrachloride ($CCl_4$) over a range of approximately 0° C. to room temperature (RT, e.g., 15-30° C.), forming the functionalized phosphate compound 210-1. In process 300-2, the alcohol 304 is reacted with phenyl dichlorophosphate in a tetrahydrofuran (THF) solution containing triethylamine ($Et_3N$). This process is carried out over a range of approximately 0° C. to room temperature (RT, e.g., 15-30° C.). This reaction produces the functionalized phosphate compound 210-1.

Figure 3B:
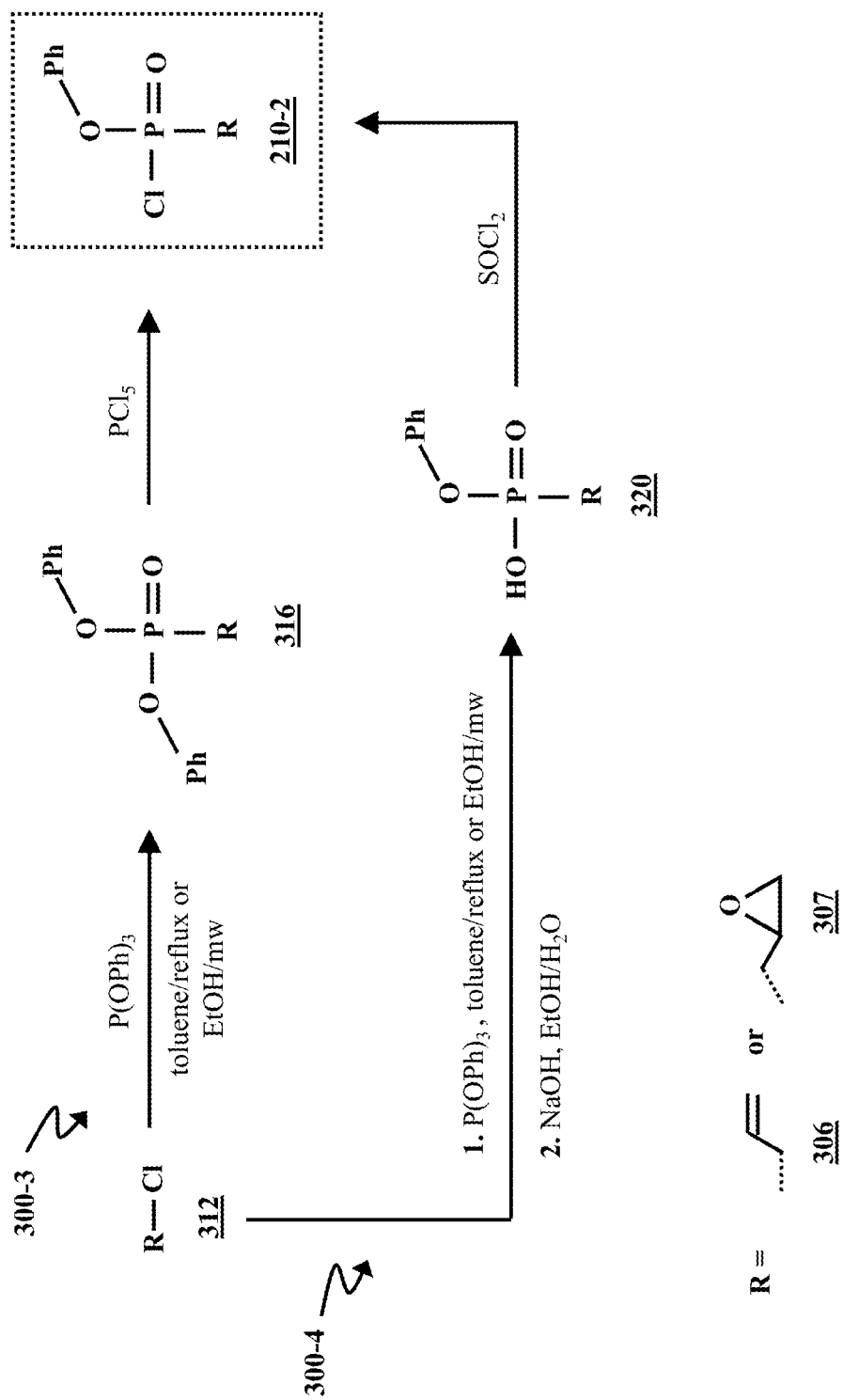
FIG. 3B is a chemical reaction diagram illustrating two processes of forming a functionalized phosphonate compound, according to some embodiments of the present disclosure.

FIG. 3B is a chemical reaction diagram illustrating two processes 300-3 and 300-4 of synthesizing a functionalized phosphonate compound 210-2, according to some embodiments of the present disclosure. In both processes 300-3 and 300-4, an organochloride 312 is a starting material for the functionalized phosphonate compound 210-2. The organochloride has either an allyl R group 306 or an epoxy R group 307. It should be noted that, as in the case of the alcohol 304, other organochlorides with chains of varying lengths (e.g., one to twelve $CH_2$ groups) can be used. Additionally, organochlorides with acrylate substituents are used in some embodiments.

In process 300-3, the organochloride 312 is reacted with triphenyl phosphite ($P(OPh)_3$). The mixture is heated, either by refluxing in toluene or microwaving (mw) in ethanol (EtOH), producing a phosphonyl ester precursor 316 to the functionalized phosphonate compound 210-2. The phosphonyl ester precursor 316 is reacted with phosphorus pentachloride ($PCl_5$) to form the functionalized phosphonate compound 210-2. In process 300-4, a mixture of the organochloride 312 and $P(OPh)_3$ is heated, either by refluxing in toluene or microwaving in EtOH, forming a phenylphosphinic acid precursor 320 to the functionalized phosphonate compound 210-2. The reaction is then quenched by raising the pH of the solution. In this example, the pH is raised by addition of an EtOH/water ($H_2O$) solution of sodium hydroxide (NaOH) to the reaction mixture. However, in some embodiments, aqueous solutions of bases other than NaOH, such as potassium hydroxide (KOH) or lithium hydroxide (LiOH), are used to quench the reaction. When the reaction has been quenched, $SOCl_2$ is added to the phenylphosphinic acid precursor 320, producing the functionalized phosphonate compound 210-2.

The processes of forming the muconic acid FR compounds illustrated herein can be carried out with different combinations of phosphorus compounds 210 and 220. In some embodiments, these processes are carried out with either all phosphate compounds (210-1 and/or 220-1) or all phosphonate compounds (210-2 and/or 220-2). In other embodiments, a mixture of both phosphate and phosphonate compounds can be used (220 and/or 210). This can yield muconic acid FR compounds with both phosphoryl 224 and phosphonyl 228 moieties. However, using a mixture of phosphate and phosphonate compounds (220 and/or 210) may also result in the production of muconic acid FR monomers with all phosphoryl 224 or all phosphonyl 228 moieties. Additionally, using a mixture of phosphate and phosphonate compounds (220 and/or 210) may yield a mixture of products that includes some combination of muconic acid FR compounds with either all phosphoryl 224 or all phosphonyl 228 moieties and muconic acid FR monomers with both phosphoryl 224 and phosphonyl 228 moieties.

Figure 3C:
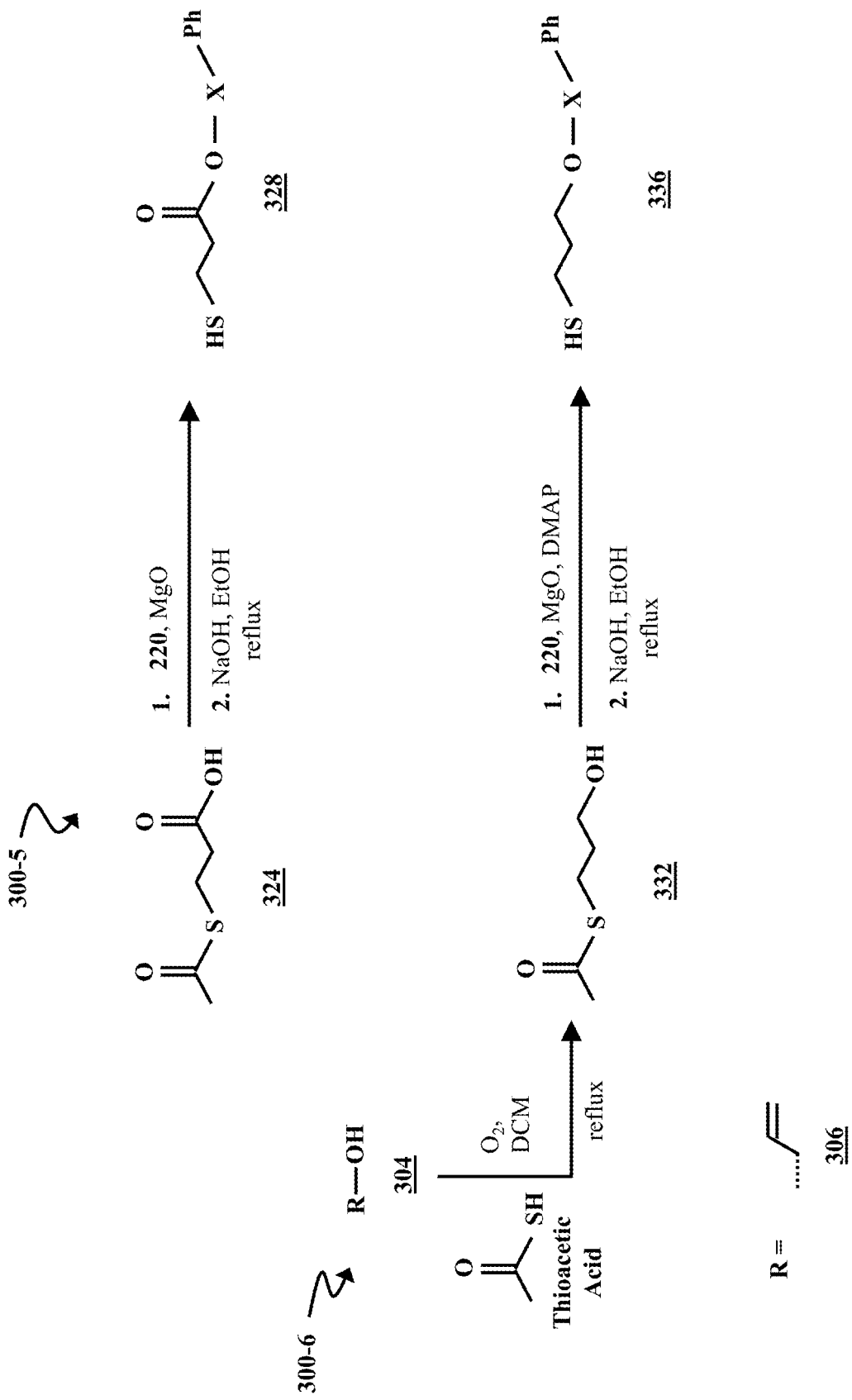
FIG. 3C is a chemical reaction diagram illustrating a process of forming a thiopropionic acid-derived thiol and a mercaptopropanol-derived thiol, according to some embodiments of the present disclosure.

FIG. 3C is a chemical reaction diagram illustrating processes 300-5 and 300-6 of synthesizing a thiopropionic acid-derived thiol and a mercaptopropanol-derived thiol, according to some embodiments of the present disclosure. In process 300-5, acetate-protected thiopropionic acid 324 is reacted with magnesium oxide (MgO) and a Ph-substituted phosphorus compound 220. The acetate group is then removed by refluxing the mixture in an EtOH solution containing NaOH, yielding a thiopropionic acid-derived thiol 328. If the process is carried out with 220-1, the thiopropionic acid-derived thiol 328 will have phosphoryl moieties 224, and if the reaction is carried out with 220-2, the thiopropionic acid-derived thiol 328 will have phosphonyl moieties 228.

In process 300-6, the alcohol 304 having an allyl R group 306 is reacted with thioacetic acid in a thiol-ene reaction. In the first step of the reaction, oxygen ($O_2$) is added to a dichloromethane (DCM) solution of the allyl alcohol 304 and thioacetic acid. The mixture is refluxed, resulting in an acetate-protected mercaptopropanol compound 332. The second step in the reaction is a substitution reaction involving a Ph-substituted phosphorus compound 220, catalytic N,N-dimethylaminopyridine (cat. DMAP), and/or a stoichiometric amount of an organic amine (e.g., $NEt_3$). It should be noted that, herein, all reactions involving a phosphorus compound and a stoichiometric amount of $NEt_3$ can instead employ catalytic DMAP in some embodiments. The acetate group is removed by refluxing the mixture in an EtOH solution containing NaOH. This step results in the production of a mercaptopropanol-derived thiol 336. If the process is carried out with 220-1, the mercaptopropanol-derived thiol 336 will have phosphoryl moieties 224, and if the reaction is carried out with 220-2, the mercaptopropanol-derived thiol 336 will have phosphonyl moieties 228.

Figure 3D:
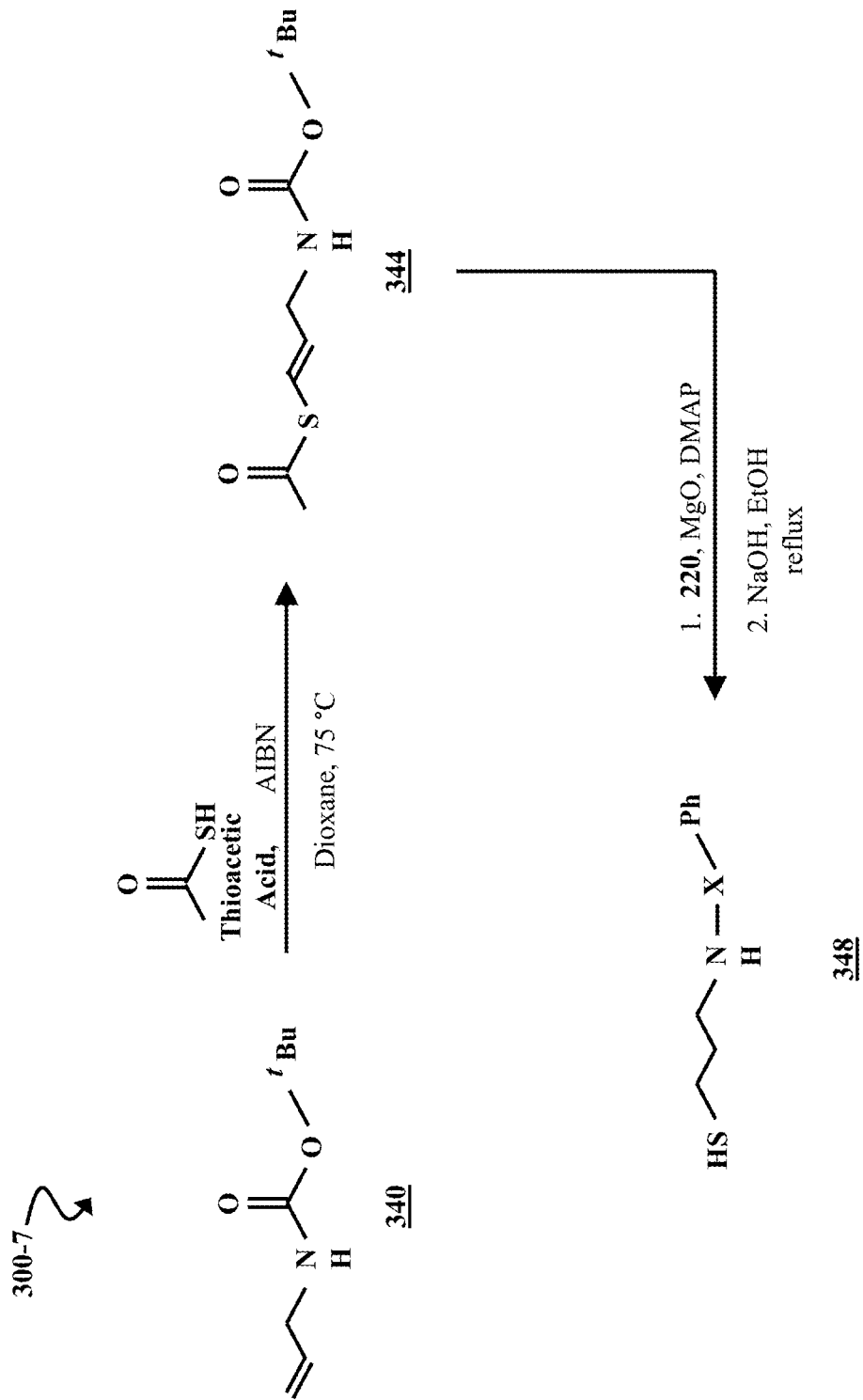
FIG. 3D is a chemical reaction diagram illustrating a process of forming an amino-butene derived thiol, according to some embodiments of the present disclosure.

FIG. 3D is a chemical reaction diagram illustrating a process 300-7 of synthesizing an amino butene-derived thiol, according to some embodiments of the present disclosure. In process 300-7, 1-(boc-amino)-3-butene 340 is combined with thioacetic acid in a dioxane solution. Azobisisobutyronitrile (AIBN) is added to the dioxane solution of 1-(boc-amino)-3-butene 340 and thioacetic acid, and the mixture is stirred at approximately 75° C., resulting in an acetate-protected amino butene compound 344. The second step in process 300-7 is a substitution reaction with a Ph-substituted phosphorus compound 220, catalytic N,N-dimethylaminopyridine (cat. DMAP), and/or a stoichiometric amount of an organic amine. The acetate group and boc groups are removed under basic conditions (e.g., by refluxing the mixture in an EtOH solution containing NaOH). This step results in the production of an amino butene-derived thiol 348. If the process is carried out with 220-1, the amino butene-derived thiol 348 will have phosphoryl moieties 224, and, if the reaction is carried out with 220-2, the amino butene-derived thiol 348 will have phosphonyl moieties 228.

Figure 3E:
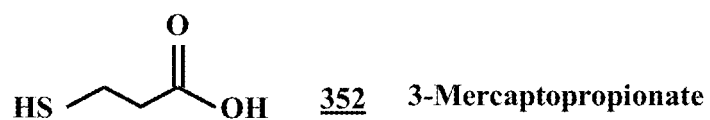
FIG. 3E is a diagrammatic representation of the molecular structures of three thiol compounds, according to some embodiments of the present disclosure.
Figure 3E:
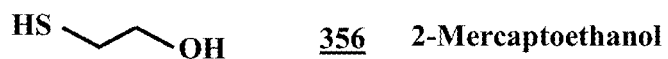
Figure 3E:
Figure 3E:
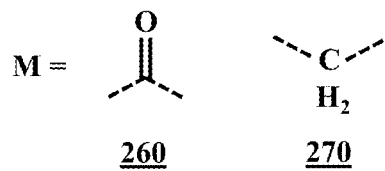

FIG. 3E is a chemical structure diagram illustrating molecular structures 302 of three thiol compounds that are involved in the synthesis of muconic acid FR compounds, according to some embodiments of the present disclosure. The three thiol compounds are 3-mercaptopropionate 352, 2-mercaptoethanol 356, and cysteamine hydrochloride 360. Each of these thiols can provide a functionalized thioether-linked moiety in the synthesis of a functionalized thioether-linked muconic acid FR compound. The syntheses and structures of functionalized thioether-linked flame retardant muconic acid FR compounds are discussed in greater detail with respect to FIG. 8C.

Figure 4A:
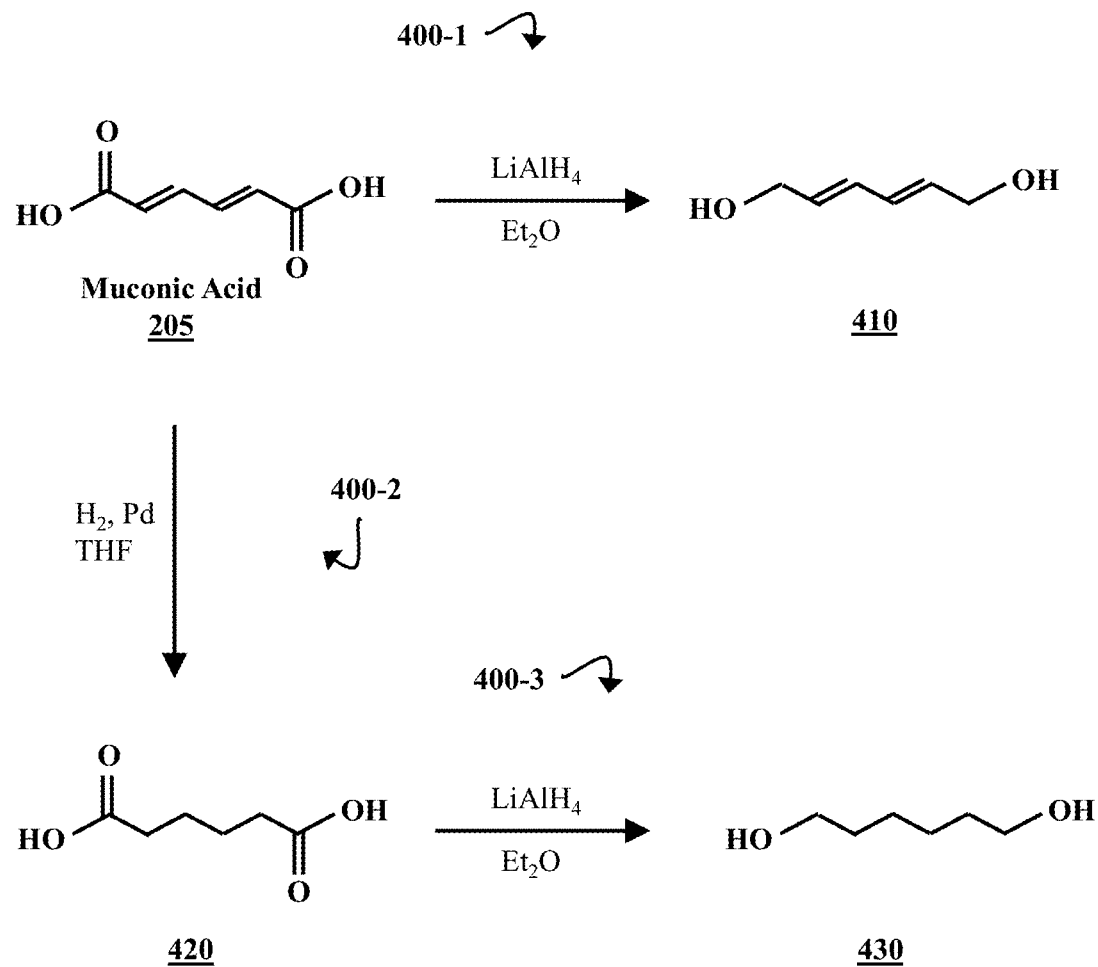
FIG. 4A is chemical reaction diagram illustrating processes of forming compounds derived from muconic acid, according to some embodiments of the present disclosure.

FIG. 4A is chemical reaction diagram illustrating processes 400-1, 400-2, and 400-3 of synthesizing compounds derived from muconic acid 205 (muconic acid compounds), according to some embodiments of the present disclosure. The muconic acid compounds produced in these reactions include a hexadiene diol 410, adipic acid 420, and 1,6-hexanediol 430. In process 400-1, muconic acid 205 is reacted with lithium aluminum hydride ($LiAlH_4$) in a diethyl ether ($Et_2O$) solution. The carboxylic acid groups on muconic acid 205 are reduced by $LiAlH_4$, yielding the hexadiene diol 410. Under the appropriate reaction conditions, process 400-1 can use reducing agents other than $LiAlH_4$ (e.g., hydrogen ($H_2$) with a palladium-on-carbon (Pd/C) catalyst, sodium borohydride ($NaBH_4$) with an electrophile (e.g., iodine), carbon monoxide (CO), iron(II) compounds, etc.).

In process 400-2, muconic acid 205 is hydrogenated in a Pd-catalyzed reaction with $H_2$ in a THF solution. This reaction produces adipic acid 420. In process 400-3, adipic acid 420 is reacted with lithium aluminum hydride ($LiAlH_4$) in a diethyl ether ($Et_2O$) solution. The carboxylic acid groups on adipic acid 420 are reduced by the $LiAlH_4$, yielding 1,6-hexanediol 430. Under the appropriate reaction conditions, process 400-3 can use reducing agents other than LiAlH$_4$ (e.g., hydrogen (H$_2$) with a palladium-on-carbon (Pd/C) catalyst, sodium borohydride (NaBH$_4$) with an electrophile (e.g., iodine), carbon monoxide (CO), iron(II) compounds, etc.).

Figure 4B:
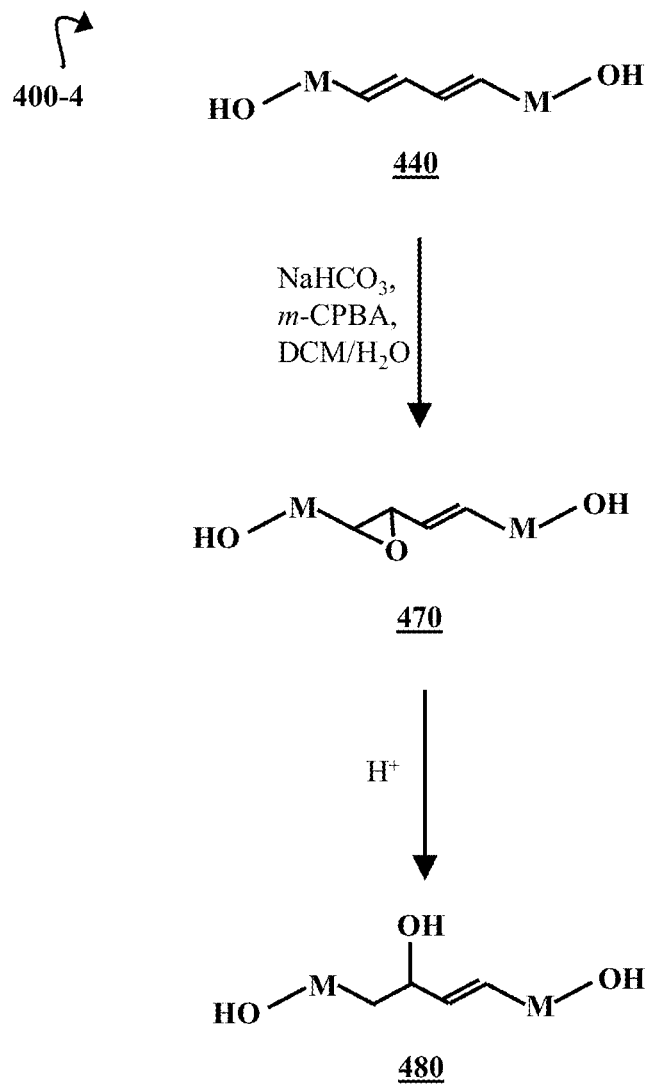
FIG. 4B is a chemical reaction diagram illustrating a process of forming a trihydroxy muconic acid compound, according to some embodiments of the present disclosure.
Figure 4B:
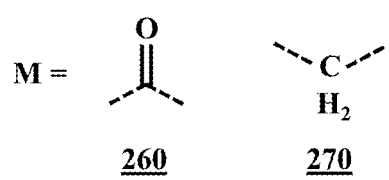

FIG. 4B is a chemical reaction diagram illustrating a process 400-4 of forming a trihydroxy muconic acid compound, according to some embodiments of the present disclosure. Process 400-4 can use either muconic acid 205 or the hexadiene diol 410 as a starting material. The two compounds 205 and 410 are represented by a generic diene muconic acid compound 440, where M represents either the carbonyl group 260 of muconic acid 205 or the methylene bridge 270 of the hexadiene diol 410. In the first step of process 400-4, the generic diene muconic acid compound 440 is combined with sodium bicarbonate (NaHCO$_3$) and meta-chloroperoxybenzoic acid (m-CPBA) in a DCM/H$_2$O solution. The mixture is reacted to form a muconic acid compound with an epoxy group 470. This compound 470 is reacted with an acid (H$^+$), such as HCl, to form a trihydroxy muconic acid compound 480. The trihydroxy muconic acid compound 480 can be either a hydroxyl dicarboxylate compound (M=260) or a triol compound (M=270), depending upon which muconic acid compound 205 or 410 is used in the reaction.

Figure 5A:
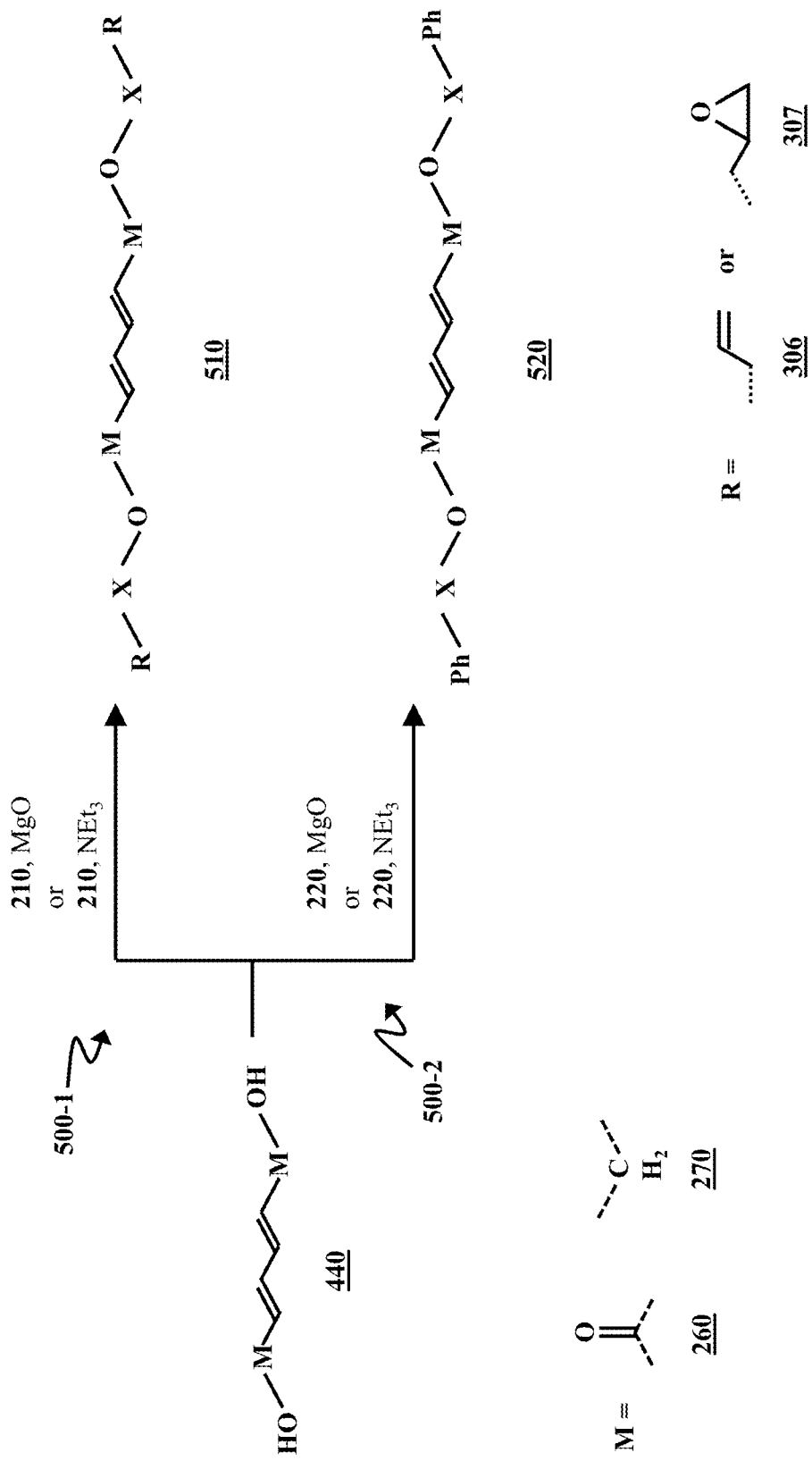
FIG. 5A is a chemical reaction diagram illustrating processes of forming diene muconic acid FR compounds, according to some embodiments of the present disclosure.

FIG. 5A is a chemical reaction diagram illustrating processes 500-1 and 500-2 of forming diene muconic acid FR compounds, according to some embodiments of the present disclosure. In process 500-1, either muconic acid 205 or the hexadiene diol 410 (diene muconic acid compound 440) is reacted with a functionalized phosphorus compound 210 to form a difunctionalized diene muconic acid compound 510, where R is an allyl group 306 or an epoxy group 307. When the diene muconic acid compound 440 is muconic acid 205 (M=260), the reaction is carried out with magnesium oxide (MgO). This reaction yields a difunctionalized diene muconic acid FR compound 510 where M is a carbonyl group 260. Alternatively, when the generic compound 440 is the hexadiene diol 410 (M=270), the reaction is carried out with a stoichiometric amount of triethylamine (NEt$_3$) in a DCM solution. This reaction produces a difunctionalized diene muconic acid FR compound 510 where M is a methylene bridge group 270.

In process 500-2, either diene muconic acid compound 440 is reacted with a Ph-substituted phosphorus compound 220 to form a Ph-substituted diene muconic acid compound 520, where R is an allyl group 306 or an epoxy group 307. When the diene muconic acid compound 440 is muconic acid 205 (M=260) the reaction includes MgO. The reaction with MgO yields a Ph-substituted diene muconic acid compound 520, where M is a carbonyl group 260. Alternatively, when the generic compound 440 is the hexadiene diol 410 (M=270) the reaction is carried out with a stoichiometric amount of NEt$_3$ in a DCM solution. This reaction produces a Ph-substituted diene muconic acid compound 520 where M is a methylene bridge group 270.

Figure 5B:
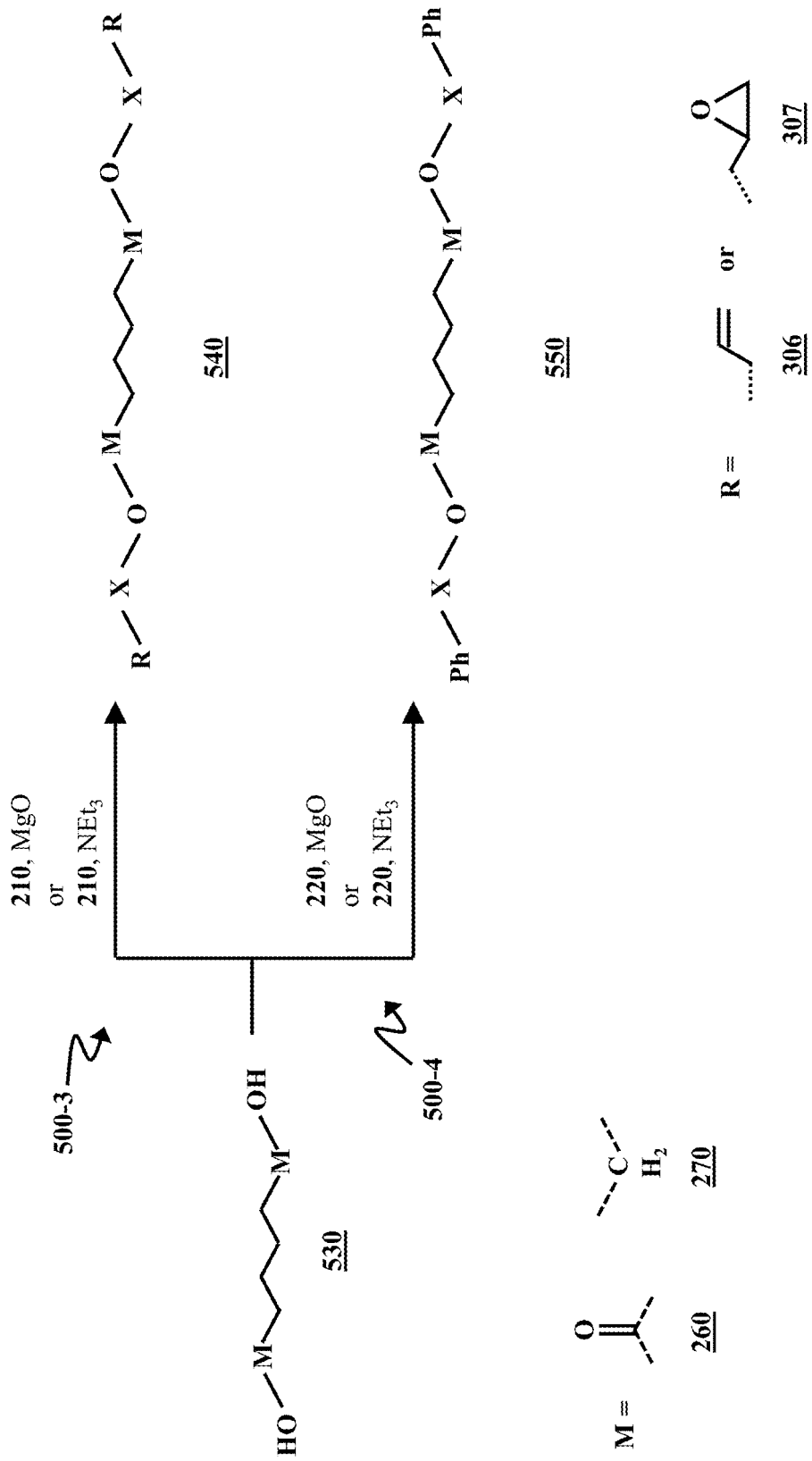
FIG. 5B is a chemical reaction diagram illustrating processes of forming two muconic acid FR compounds, according to some embodiments of the present disclosure.

FIG. 5B is a chemical reaction diagram illustrating processes 500-3 and 500-4 of forming two muconic acid FR compounds, according to some embodiments of the present disclosure. In process 500-2, either adipic acid 420 or 1,6-hexanediol 430 (each represented by a generic muconic acid compound 530) is reacted with a functionalized phosphorus compound 210 to form a difunctionalized muconic acid compound 540, where R is an allyl group 306 or an epoxy group 307. When the generic muconic acid compound 530 is adipic acid 420 (M=260) the reaction is carried out with MgO. This reaction yields a difunctionalized muconic acid FR compound 540, where M is a carbonyl group 260. Alternatively, when the generic compound 530 is 1,6-hexanediol 430 (M=270), the reaction is carried out with a stoichiometric amount of NEt$_3$ in a DCM solution. This reaction produces a difunctionalized muconic acid FR compound 540 where M is a methylene bridge group 270.

In process 500-3, either adipic acid 420 or the 1,6-hexanediol 430 (generic muconic acid compound 530) is reacted with a Ph-substituted phosphorus compound 220 to form a Ph-substituted muconic acid compound 550. When the generic muconic acid compound 530 is adipic acid 420 (M=260) the reaction includes MgO. The reaction with MgO yields a Ph-substituted muconic acid compound 550, where M is a carbonyl group 260. Alternatively, when the generic compound 530 is 1,6-hexanediol 430 (M=270), the reaction is carried out with a stoichiometric amount of NEt$_3$ in a DCM solution. This reaction produces a Ph-substituted muconic acid compound 550 where M is a methylene bridge group 270.

Figure 5C:
FIG. 5C is a chemical reaction diagram illustrating a process of forming a monohydroxy muconic acid FR compound and a monofunctionalized muconic acid FR compound, according to some embodiments of the present disclosure.
Figure 5C:
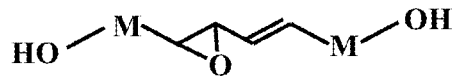
Figure 5C:
Figure 5C:
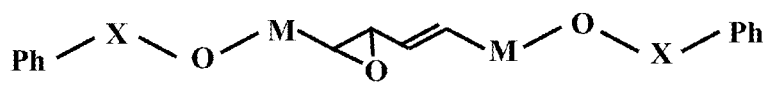
Figure 5C:
Figure 5C:
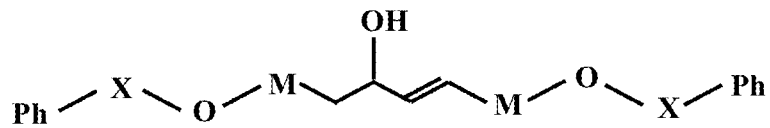
Figure 5C:
Figure 5C:
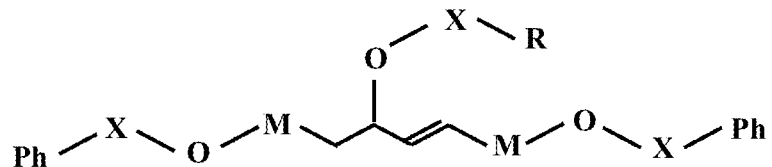

FIG. 5C is a chemical reaction diagram illustrating a process 500-5 of forming a monohydroxy muconic acid FR compound and a monofunctionalized muconic acid FR compound, according to some embodiments of the present disclosure. In the first step of process 500-5, a muconic acid compound with an epoxy group 470 is reacted with a Ph-substituted phosphorus compound 220. When M is a carbonyl group 260 the reaction is carried out with MgO, and when M is a methylene bridge group 270 the reaction is carried out with stoichiometric NEt$_3$. This reaction produces a Ph-substituted muconic acid FR compound 560 with an epoxy group. A hydroxyl group is formed in a ring-opening reaction with the epoxy group when an acid (H$^+$) is added to the reaction mixture. This produces a monohydroxy muconic acid FR compound 570. The monohydroxy muconic acid FR compound 570 is then reacted with a functionalized phosphorus compound 210 and stoichiometric NEt$_3$. This reaction produces a monofunctionalized muconic acid FR compound 580 with either an allyl 306 or an epoxy 307 R group.

By altering the identities of the phosphorus compounds 210 and/or 220 used in process 500-5, alternative muconic acid FR compounds with varying degrees of functionality can be formed (not shown). For example, if a functionalized phosphorus compound 210 is used in place of the Ph-substituted phosphorus compound 220 in the first step of process 500-5, a trifunctionalized muconic acid FR compound will form. If a Ph-substituted phosphorus compound 220 is used in place of the functionalized phosphorus compound 210 in the reaction with the monohydroxy compound 570, a Ph-substituted muconic acid FR compound will form. Further, a difunctionalized muconic acid FR compound can be formed by including the functionalized phosphorus compound 210 in the first step, followed by the Ph-substituted phosphorus compound 220 in the second step.

Figure 6A:
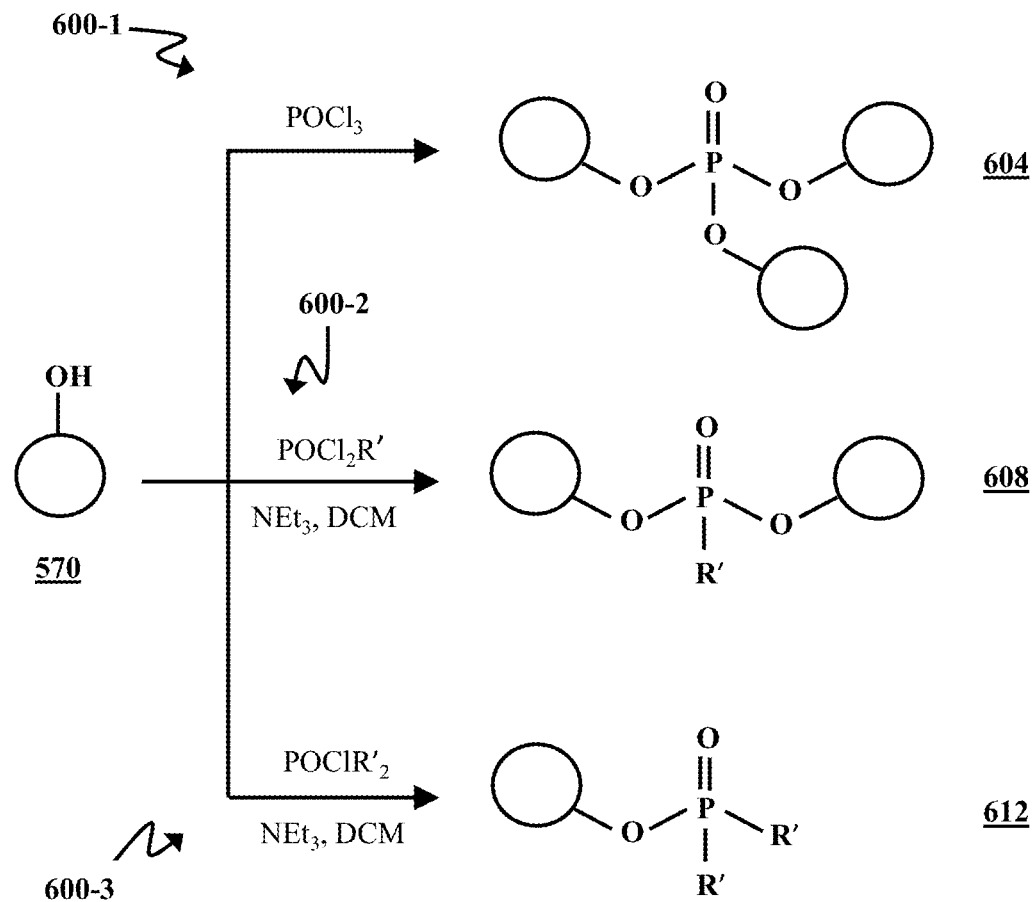
FIG. 6A is a chemical reaction diagram illustrating processes of forming phosphate, phosphonate, and phosphinate muconic acid FR compounds, according to some embodiments of the present disclosure.

FIG. 6A is a chemical reaction diagram illustrating processes 600-1, 600-2, and 600-3 of forming phosphate, phosphonate, and phosphinate muconic acid FR compounds, according to some embodiments of the present disclosure. These compounds are derived from the monohydroxy muconic acid FR compound 570 synthesized in process 570. FIG. 5C illustrates the skeleton structure of the monohydroxy muconic acid FR compound 570. However, in FIG. 6A the monohydroxy muconic acid FR compound 570 is represented by a white circle with a hydroxyl group. The portion of the monohydroxy muconic acid FR compound 570 other than its hydroxyl group are represented by the white circle. This portion is also represented as a white circle in the additional structures illustrated in FIGS. 6A-6C.

In process 600-1, the monohydroxy muconic acid FR compound 570 is reacted with phosphoryl chloride ($POCl_3$). The product of this reaction is referred to herein as a phosphate muconic acid FR compound 604. In process 600-2, the monohydroxy muconic acid FR compound 570 is reacted with a phosphonic dichloride compound ($POCl_2R'$) and $NEt_3$ in a DCM solution. This reaction produces a phosphonate muconic acid FR compound 608 with one R' group. Similarly, in process 600-3, the monohydroxy muconic acid FR compound 570 is reacted with a phosphinic chloride compound ($POClR'_2$) and $NEt_3$ in a DCM solution to form a phosphinate muconic acid FR compound 612 with two R' groups. Examples of R' groups can include alkyl (e.g., methyl, ethyl, propyl, isopropyl, butyl, etc.), aryl (phenyl, tolyl, xylyl, naphthyl, etc.), alkoxy (e.g., methoxy, ethoxy, n-propoxy, i-propoxy, n-butoxy, i-butoxy, etc.), and aryloxy (e.g., phenoxy, toloxy, xyloxy, naphthoxy, etc.) groups.

Figure 6B:
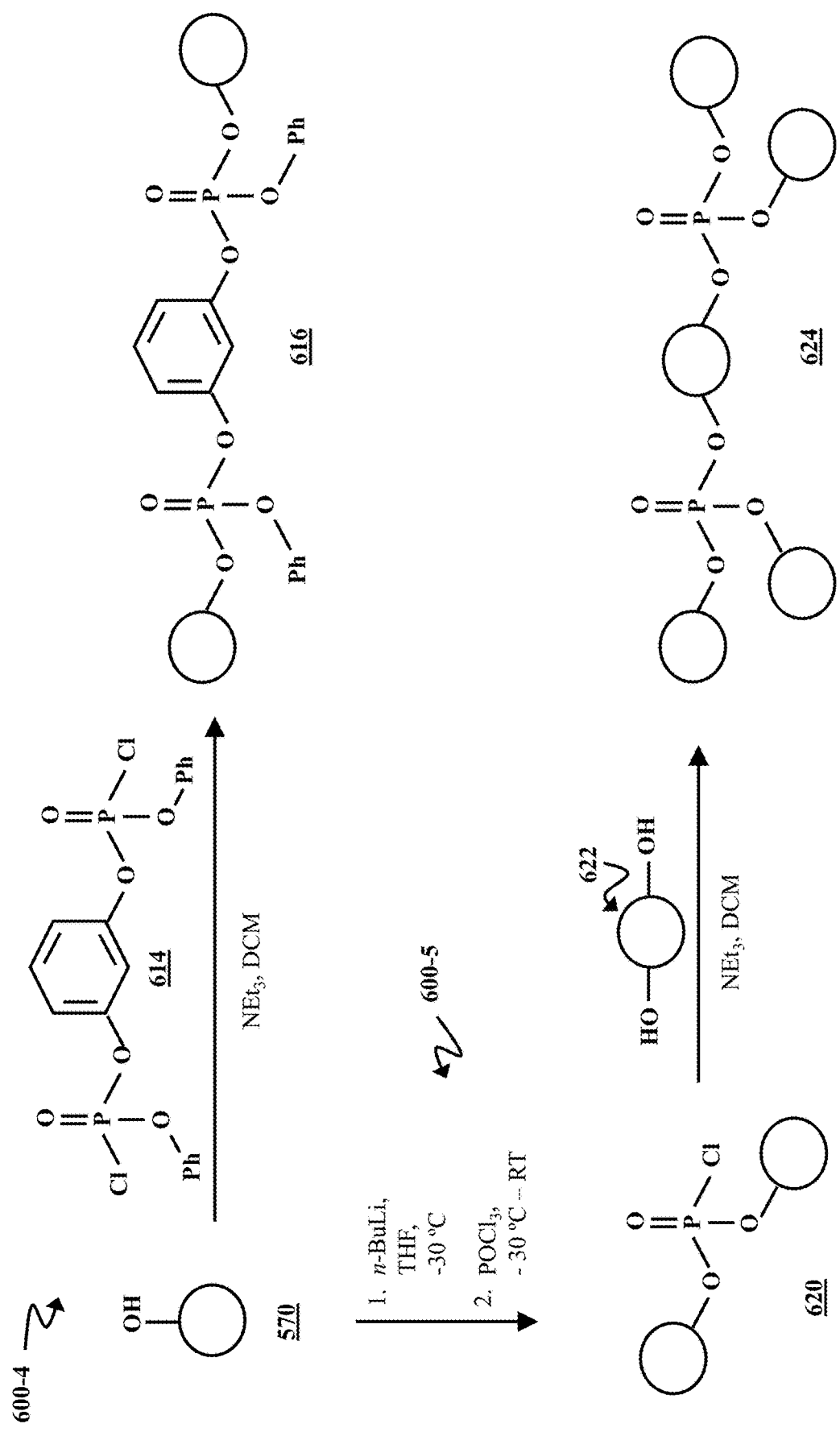
FIG. 6B is a chemical reaction diagram illustrating processes of forming muconic acid FR dimers, according to some embodiments of the present disclosure.

FIG. 6B is a chemical reaction diagram illustrating processes 600-4 and 600-5 of forming muconic acid FR dimers, according to some embodiments of the present disclosure. In process 600-4, diphenyl 1,3-phenylenebis(chlorophosphate) 614 and $NEt_3$ are combined with the monohydroxy muconic acid FR compound 570 in DCM. These components react to form a 1,3-phenylenebis (muconic acid FR) compound 616. In some embodiments, the monohydroxy muconic acid FR compound 570 is replaced by a monohydroxy muconic acid FR compound having R functional groups. In these instances, a 1,3-phenylenebis(muconic acid FR) compound having four functional groups (not shown) can form.

In process 600-5, the monohydroxy muconic acid FR compound 570 is reacted with n-butyllithium (n-BuLi) in THF at approximately −30° C. This is followed by the addition of $POCl_3$. The reaction proceeds as the mixture is allowed to warm to room temperature. This reaction forms a muconic acid FR chlorophosphate compound 620, which is then reacted with a dihydroxy muconic acid compound 622 (e.g., compound 410 or 430) and $NEt_3$ in a DCM solution to form a bis(muconic acid FR) compound 624. In some embodiments, the dihydroxy muconic acid compound 622 is replaced by a monohydroxy muconic acid FR compound (e.g., compound 570) or a trihydroxy muconic acid compound 480 (where M=470). In these instances, each hydroxyl group can bind a muconic acid FR chlorophosphate compound 620 to form compounds having varying sizes and numbers of R functional groups and/or alkyl substituents. Similarly, the monohydroxy muconic acid FR compound 570 can be replaced by a monohydroxy muconic acid FR compound having R functional groups to provide additional variations.

Figure 6C:
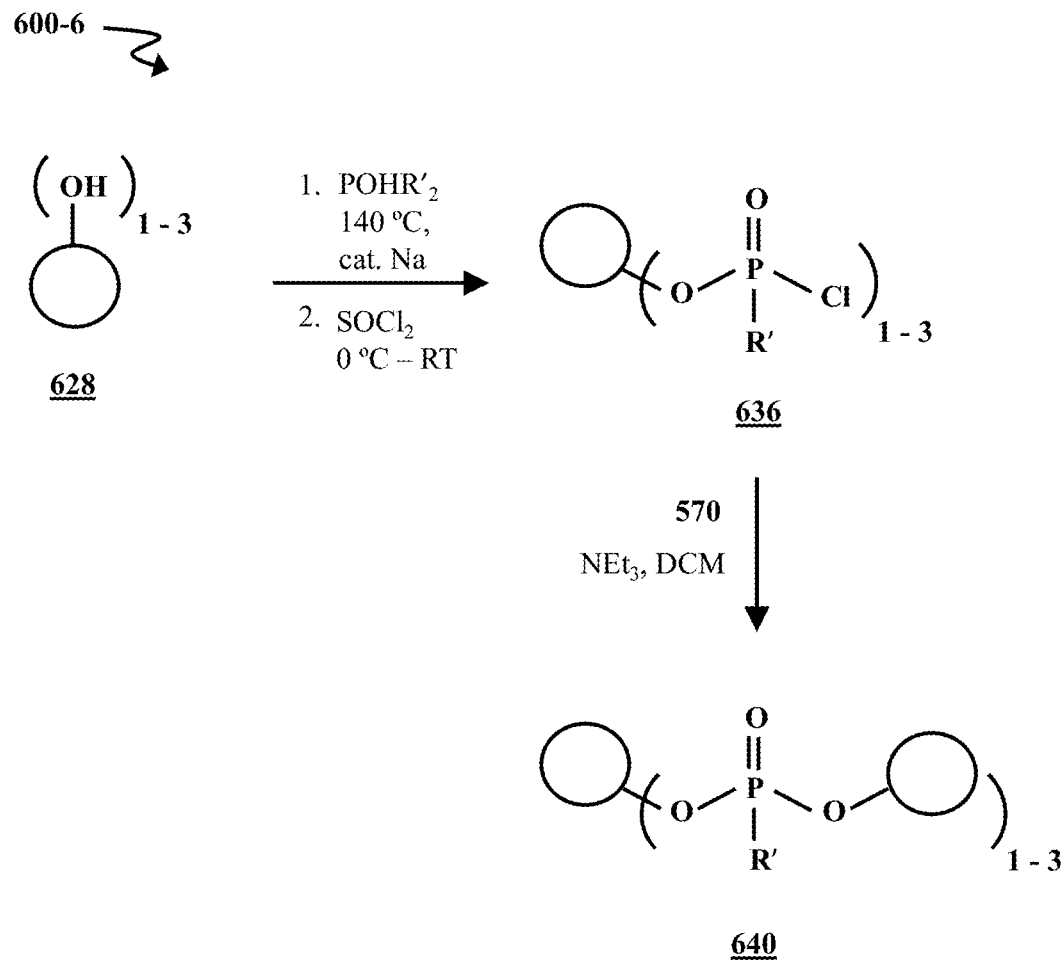
FIG. 6C is a chemical reaction diagram illustrating a process of forming flame-retardant compounds having at least two muconic acid moieties, according to some embodiments of the present disclosure.

FIG. 6C is a chemical reaction diagram illustrating a process 600-6 of forming flame-retardant compounds having at least two muconic acid moieties, according to some embodiments of the present disclosure. Process 600-6 begins with a mono-, di-, or trihydroxy muconic acid compound 628 (e.g., compound 410, 430, 480, or 570). The selected hydroxy muconic acid compound 628 is reacted with an organo-phosphine oxide $POHR'_2$(R'=alkyl, aryl, or aryloxy) and catalytic sodium (cat. Na) at approximately 140° C. Then, the mixture is cooled to approximately 0° C., and $SOCl_2$ is added to the reaction. The mixture is then warmed to room temperature as it forms a muconic acid FR compound 636 having one, two, or three chlorophosphinate substituents. This compound 636 is reacted with $NEt_3$ in a DCM solution, yielding a muconic acid FR compound 640 having two, three, or four muconic acid FR moieties connected by phosphonate linking groups.

Processes 600-1-600-4 and 600-6 are illustrated herein as being carried out with a monohydroxy muconic acid FR compound 570. However, these processes could instead employ a dihydroxy muconic acid compound (e.g., compound 410 or 430) or a trihydroxy muconic acid compound (e.g., compound 480, where M=470). Di- and trihydroxy muconic acid compounds can each bind to more than one phosphorus compound ($POCl_3$, $POCl_2R'$, or $POClR'_2$) in the reaction mixture. This allows the size of the resulting muconic acid-derived flame-retardant compounds to be varied, as well as the percentage of phosphorus-based flame-retardant moieties.

Further, the monohydroxy muconic acid FR compound 570 used in process 600-1-600-4 and 600-6 is Ph substituted. However, this compound 570 can be replaced by monohydroxy muconic acid FR compounds having R functional groups in some embodiments. Compounds such as these are discussed in greater detail with respect to FIG. 5C. For example, if monohydroxy muconic acid FR compounds having R functional groups are used in process 600-6, muconic acid FR compounds having up to eight R functional groups can form. This is discussed in greater detail with respect to FIG. 6B. These functional groups allow the compounds to polymerize, act as cross-linkers, and/or participate in a variety of other reactions. Examples of these reactions are discussed in greater detail with respect to FIGS. 8A-9.

Figure 7:
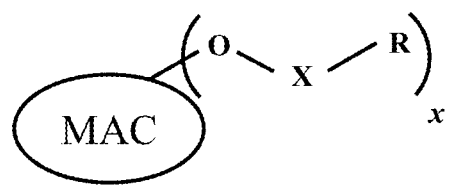
FIG. 7 is a chemical structure diagram illustrating a generic muconic acid FR compound, according to some embodiments of the present disclosure.
Figure 7:
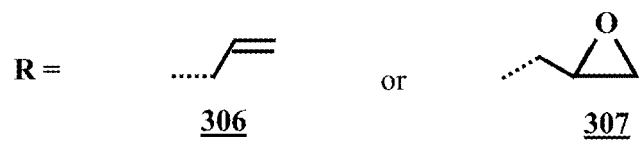

FIG. 7 is a chemical structure diagram 700 illustrating a generic muconic acid FR compound 710, according to some embodiments of the present disclosure. The generic compound 710 represents monofunctionalized muconic acid FR compounds (x=1), difunctionalized muconic acid FR compounds (x=2), and trifunctionalized muconic acid FR compounds (x=3). These compounds are referred to collectively as functionalized muconic acid FR compounds 710. The generic compound 710 is illustrated with only R functionalized substituents (e.g., allyl 306 or epoxy 307). An oval labeled "MAC" represents the muconic acid compound core of each monomer, which can include additional phosphorus-based moieties and alkyl substituents in addition to its muconic acid moiety. Examples of compounds represented by the generic muconic acid FR compound 710 are discussed in greater detail with respect to FIGS. 5A-5C.

In some embodiments, the functionalized muconic acid FR compounds 710 (x=1, 2, or 3) are polymerized to form muconic acid FR polymers. Examples of polymerization reactions are discussed in greater detail with respect to FIG. 9. The monofunctionalized muconic acid FR compounds 710 (x=1) can also be bound to polymer chains in order to impart flame retardancy to the polymer. Further, the di- and tri-functionalized muconic acid FR compounds 710 (x=2 or 3) can be used as flame-retardant crosslinkers when bound to polymer chains. Additionally, reactions involving the R functional groups can be carried out in order to modify the muconic acid FR compounds 710. Examples of these reactions are discussed in greater detail with respect to FIGS. 8A-8C. The resulting modified muconic acid FR compounds can also be polymerized, bound to polymers, or blended with polymers to form flame-retardant polymers.

Reactions carried out with the functionalized muconic acid compounds 710 illustrated in FIG. 7 can also be carried out with other muconic acid FR compounds (e.g., compounds 604, 608, 612, 616, 624, 640, etc.). Examples of these compounds are discussed in greater detail with respect to FIGS. 6A-6C. The compounds illustrated in FIGS. 6A-6C can include varying numbers of R functional groups. (e.g., 0-8). Reactions involving R functional groups on these compounds are not illustrated herein. However, their allyl 306 and epoxy 307 R groups have reactive properties that are substantially similar to the allyl 306 and epoxy 307 R groups on the generic muconic acid FR compound 710. Depending on the selection of muconic acid FR compound, reaction conditions may need to be modified appropriately, as would be understood by a person of ordinary skill in the art.

Figure 8A:
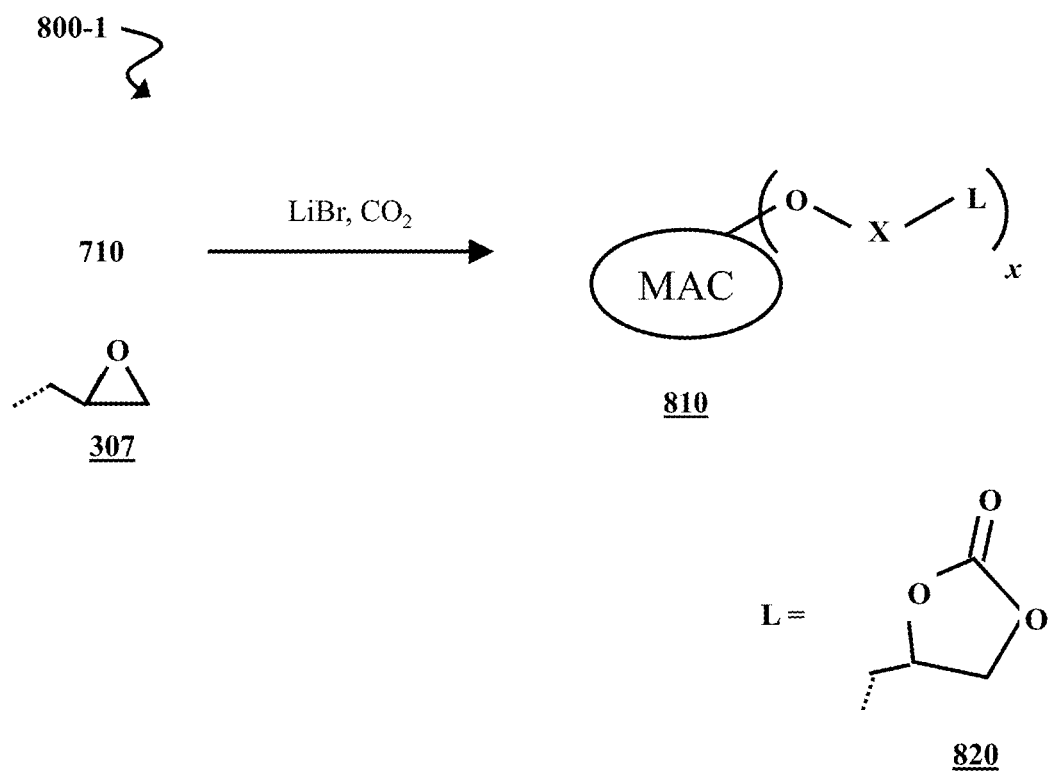
FIG. 8A is a chemical reaction diagram illustrating a process of forming propylene carbonate-functionalized muconic acid FR compounds, according to some embodiments of the present disclosure.

FIG. 8A is a chemical reaction diagram illustrating a process 800-1 of forming propylene carbonate-functionalized muconic acid FR compounds, according to some embodiments of the present disclosure. In this reaction, a functionalized muconic acid FR compound 710 having epoxy R groups 307 is combined with lithium bromide (LiBr). Carbon dioxide ($CO_2$) is added to the mixture. The epoxy R groups 307 on the functionalized muconic acid FR compound 710 reacts with $CO_2$ to form a propylene carbonate-functionalized muconic acid FR compound 810. Each of these compounds 810 can have one, two, or three propylene carbonate groups 820, which are represented by "L". The number of propylene carbonate L groups 820 depends upon the number of epoxy R groups 307 on the selected functionalized muconic acid FR compound 710.

Figure 8B:
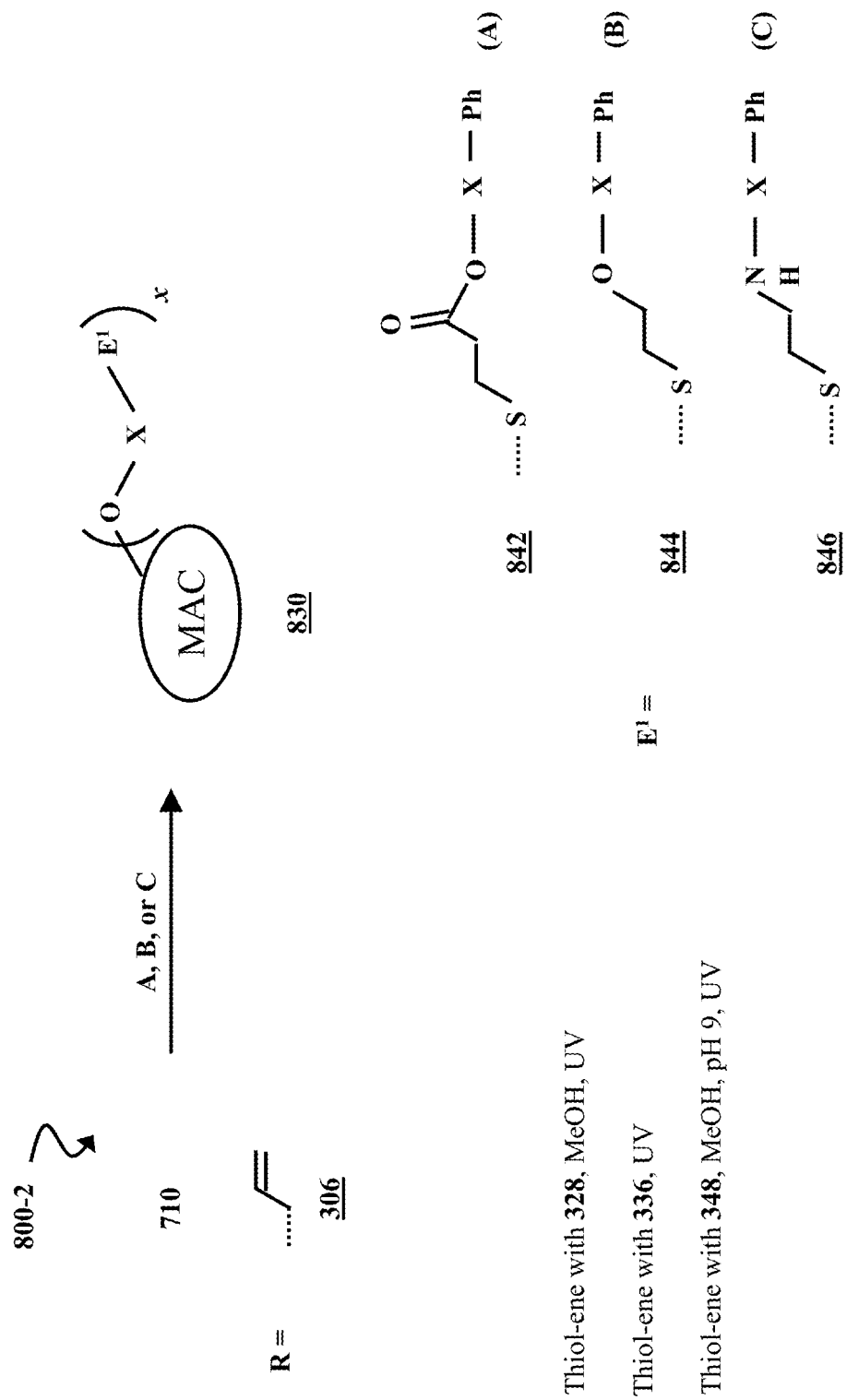
FIG. 8B is a chemical reaction diagram illustrating a process of forming Ph-substituted thioether-linked muconic acid FR compounds, according to some embodiments of the present disclosure.

FIG. 8B is a chemical reaction diagram illustrating a process 800-2 of forming Ph-substituted thioether-linked muconic acid FR compounds, according to some embodiments of the present disclosure. Process 800-2 is carried out under reaction conditions A, B, or C. Each of these reaction conditions is a thiol-ene reaction between a functionalized muconic acid FR compound 710 with allyl R groups 306 and a Ph-substituted thiol 328, 336, or 348. The syntheses and structures of the Ph-substituted thiol compounds are discussed in greater detail with regard to FIGS. 3C and 3D. Each thiol compound reacts with an allyl group 306 on the functionalized muconic acid FR compound 710. This reaction produces a muconic acid compound 830 having at least one thioether-linked substituent ($E^1$) 842, 844, or 846. The number of $E^1$ substituents depends upon the number of allyl R groups 306 on the functionalized muconic acid FR compound 710.

Under reaction conditions A, the allyl-functionalized muconic acid FR compound 710 is reacted with the thiopropionic acid-derived thiol 328 under UV light in a methanol (MeOH) solution. The resulting $E^1$-linked muconic acid FR compound 830 has at least one $E^1$ substituent 842 corresponding with the thiopropionic acid-derived thiol 328. Under reaction conditions B, the allyl-functionalized muconic acid FR compound 710 is reacted with the mercaptopropanol-derived thiol 336 under UV light. The resulting $E^1$-linked muconic acid FR compound 830 has at least one $E^1$ substituent 844 corresponding with the mercaptopropanol-derived thiol 336. Under reaction conditions C, the allyl-functionalized muconic acid FR compound 710 is reacted with the amino butene-derived thiol 348 under UV light in a pH 9 methanol solution. The resulting $E^1$-linked muconic acid FR compound 830 has at least one $E^1$ substituent 846 corresponding with the amino butene-derived thiol 348. The $E^1$-linked muconic acid FR compound 830 can be incorporated into polymers by blending.

Figure 8C:
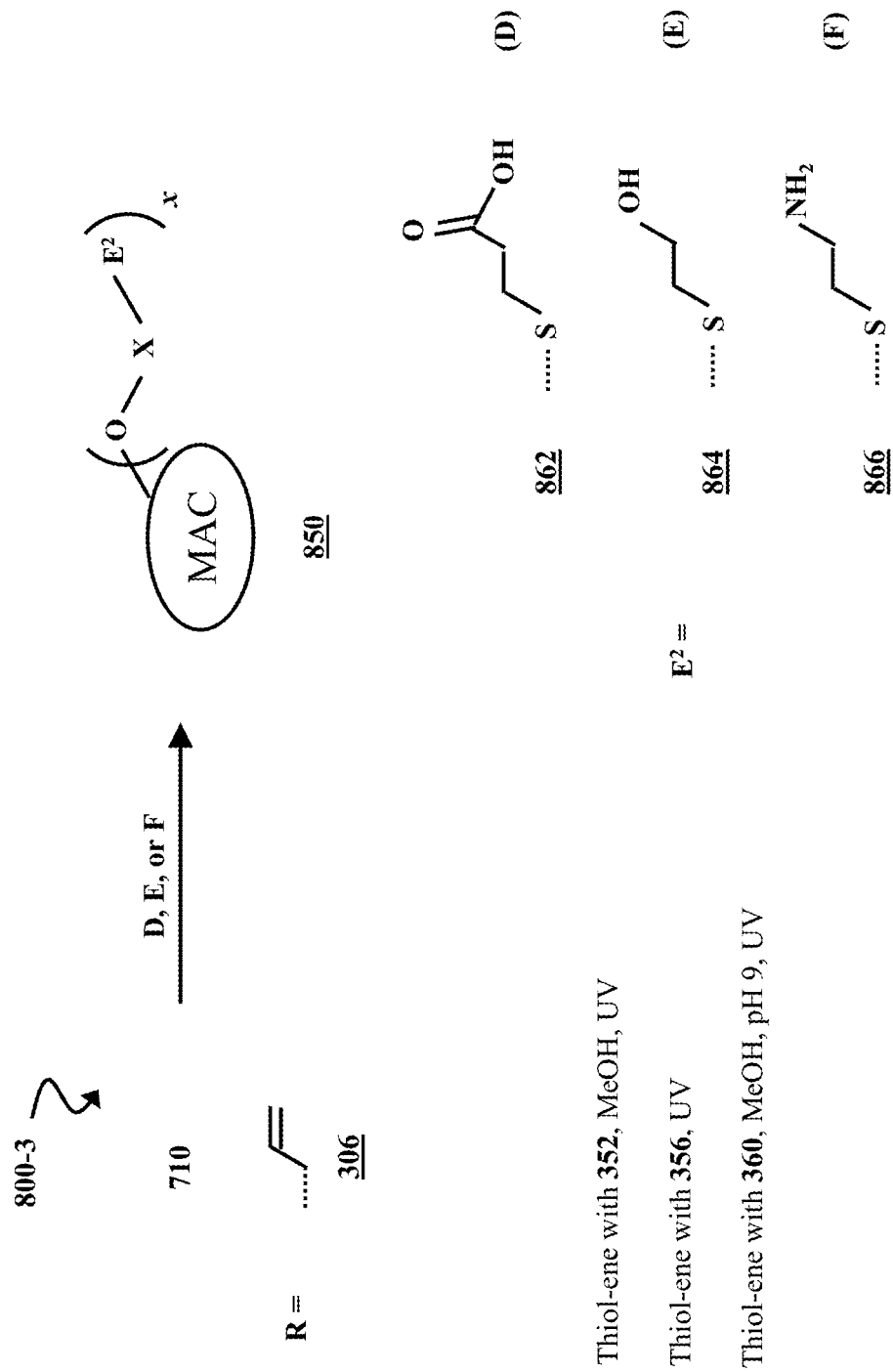
FIG. 8C is a chemical reaction diagram illustrating a process of forming functionalized thioether-linked muconic acid FR compounds, according to some embodiments of the present disclosure.

FIG. 8C is a chemical reaction diagram illustrating a process 800-3 of forming functionalized thioether-linked muconic acid FR compounds, according to some embodiments of the present disclosure. Process 800-3 is carried out under reaction conditions D, E, or F. Each of these reaction conditions is a thiol-ene reaction between a functionalized muconic acid FR compound 710 with allyl R groups 306 and a thiol with an additional functional group (e.g., a carboxylate, hydroxyl, or amino functional group). Each thiol reacts with an allyl group 306 on the allyl-functionalized muconic acid FR compound 710. This reaction produces a functionalized muconic acid FR compound 850 having thioether-linked substituents ($E^2$) 862, 864, or 866. The number of $E^2$ substituents depends upon the number of allyl R groups 306 on the functionalized muconic acid FR compound 710. The $E^2$-linked muconic acid FR compounds 850 can be bound to polymer chains either individually or as a cross-linker.

Under reaction conditions D, the functionalized muconic acid FR compound 710 having allyl R groups 306 is reacted with 3-mercaptopropionate 352 under UV light in a methanol (MeOH) solution. The resulting $E^2$-linked muconic acid FR compound 850 has at least one carboxylate-functionalized $E^2$ substituent 862. Under reaction conditions E, the functionalized muconic acid FR compound 710 having allyl R groups 306 is reacted with 2-mercaptoethanol 356 under UV light. The resulting $E^2$-linked muconic acid FR compound 850 has at least one hydroxy-functionalized $E^2$ substituent 864. Under reaction conditions F, the functionalized muconic acid FR compound 710 having allyl R groups 306 is reacted with cysteamine HCl 360 under UV light in a pH 9 methanol solution. The resulting $E^2$-linked muconic acid FR compound 850 has at least one amino-functionalized $E^2$ substituent 866.

Figure 9:
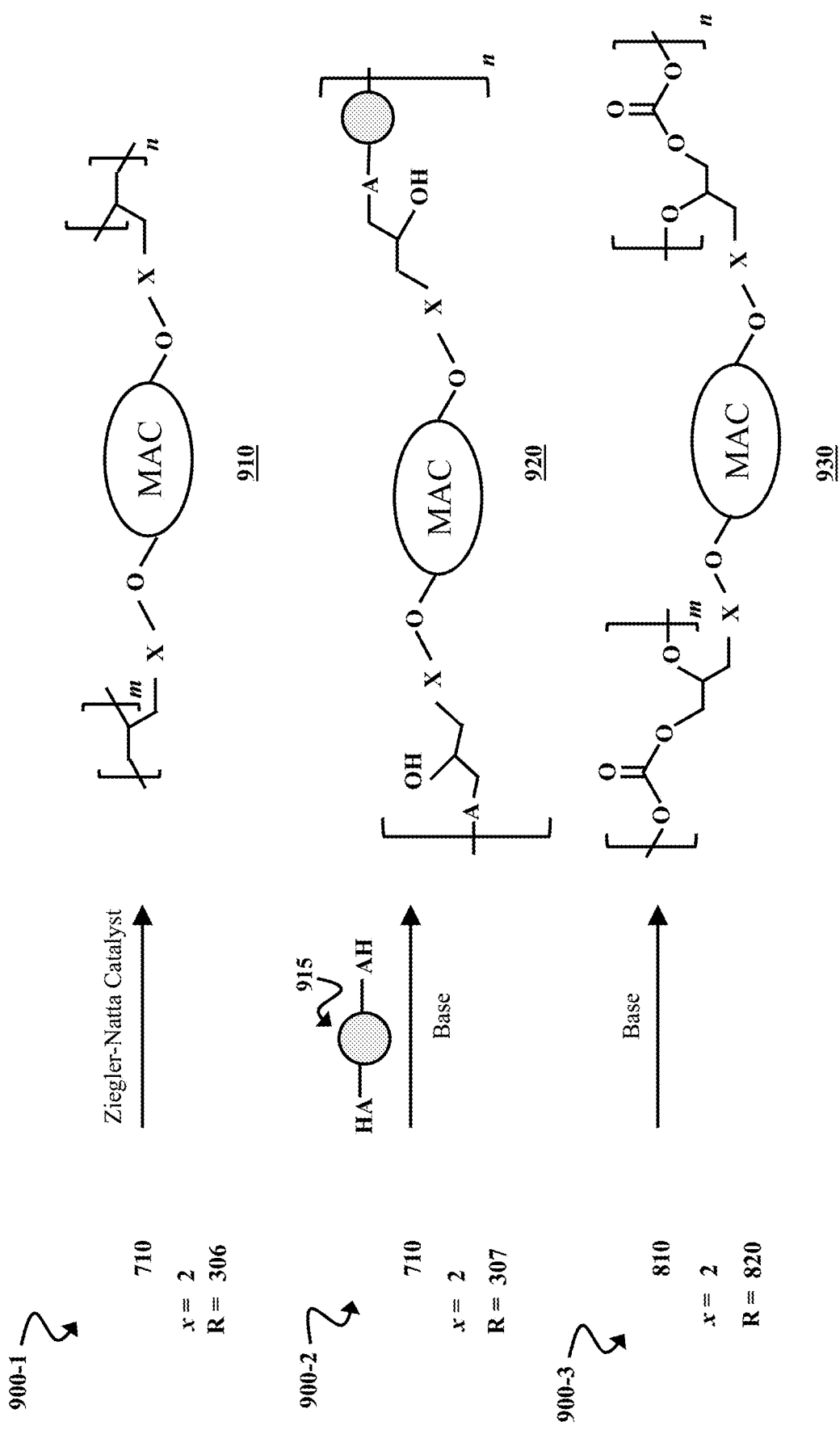
FIG. 9 is a chemical reaction diagram illustrating processes of forming muconic acid FR polymers from muconic acid FR compounds, according to some embodiments of the present disclosure.

FIG. 9 is a chemical reaction diagram illustrating processes 900-1, 900-2, and 900-3 of synthesizing muconic acid FR polymers from functionalized muconic acid FR compounds 710 and 810, according to some embodiments of the present disclosure. The polymers illustrated herein are examples of polymers that can be produced by polymerizing functionalized muconic acid FR monomers, but other polymers can be produced as well (e.g., by changing reaction conditions, co-monomers, R groups, etc.). An array of classes of flame retardant polymers can be made with different combinations of monomers. Examples of these polymerization processes are in accordance with polymer chemistry platforms that can include polyhydroxyurethanes, polycarbonates, polymers obtained by radical polymerization, polyurethanes, polyesters, polyacrylates, epoxy resins, polyimides, polyureas, polyamides, poly(vinyl-esters), etc.

Processes 900-1–900-3 illustrate the polymerization of difunctionalized muconic acid FR compounds 710 (x=2) only. However, it should be noted that these polymerization reactions can also be carried out with the trifunctionalized muconic acid FR compounds 710 (x=3) or, in some embodiments, any of the polyfunctionalized muconic acid FR compounds discussed above (e.g., compounds 624 or 640). Additionally, processes 900-1 and 900-3 can be carried out with monofunctionalized muconic acid FR compounds 710 (x=1). Further, in some embodiments, the polymerization reactions are carried out with a combination of both difunctionalized muconic acid FR compounds 710 (x=2) and trifunctionalized muconic acid FR compounds 710 (x=3), both difunctionalized muconic acid FR compounds 710 (x=2) and monofunctionalized muconic acid FR compounds 710 (x=1), both trifunctionalized muconic acid FR compounds 710 (x=3) and monofunctionalized muconic acid FR compounds 710 (x=1), or a combination of functionalized muconic acid FR compounds that includes mono-, di-, tri-, and/or polyfunctionalized compounds in any ratio.

In process 900-1, allyl-derived muconic acid FR polymers 910 are formed from allyl-difunctionalized muconic acid FR compounds 710 (x=2, R=306). The allyl-difunctionalized muconic acid FR compound 710 is reacted with a Ziegler- Natta catalyst. Ziegler-Natta catalysts catalyze the polymerization of 1-alkenes. Examples of these catalysts can include heterogeneous Ziegler-Natta catalysts based on titanium compounds and homogeneous Ziegler-Natta catalysts based on complexes of titanium, zirconium, or hafnium. Heterogeneous and homogeneous Ziegler-Natta catalysts can be used in combination with organoaluminum co-catalysts in some embodiments.

In process 900-2, epoxy-derived muconic acid FR polymers 920 are formed from epoxy-difunctionalized muconic acid FR compounds 710 (x=2, R=307). A selected epoxy-difunctionalized muconic acid FR compound 710 is reacted with a base and a second monomer 915. The second monomer 915 is a compound with at least two hydroxyl (OH) groups or at least two amino ($NH_2$) groups (e.g., diols, polyols, diamines, polyamines, etc.). These compounds 915 are generically represented by a gray oval with two attached AH groups. The AH groups represent hydroxyl groups (A=O) or amino groups (A=NH). In some embodiments, the epoxy-difunctionalized muconic acid-based compounds 710 self-polymerize under basic conditions. In these instances, the reaction does not include the second monomer 915.

In process 900-3, propylene carbonate-derived muconic acid FR polymers 930 are formed from propylene carbonate-difunctionalized muconic acid FR compounds 810 (x=2, R=820). The propylene carbonate-difunctionalized muconic acid FR compound 810 is reacted in a ring-opening polymerization initiated by a base. Examples of bases that can be used as initiators can include potassium hydroxide (KOH), sodium hydroxide (NaOH), lithium hydroxide (LiOH), 1,8-diazabicyclo[5.4.0]undec-7-ene (DBU), triazabicyclodecene (TBD), alkoxide or acetate bases, etc.

It should be noted that, in some embodiments, the compounds described herein can contain one or more chiral centers. These can include racemic mixtures, diastereomers, enantiomers, and mixtures containing one or more stereoisomer. Further, the disclosed compounds can encompass racemic forms of the compounds in addition to individual stereoisomers, as well as mixtures containing any of these.

The synthetic processes discussed herein and their accompanying drawings are not to be construed as limiting. One skilled in the art would recognize that a variety of synthetic reactions may be used that vary in reaction conditions, components, methods, etc., which ultimately generate one or both of muconic acid FR compounds and their corresponding polymer derivatives. In addition, the reaction conditions can optionally be changed over the course of a process. Further, in some embodiments, processes can be added or omitted while still remaining within the scope of the disclosure, as will be understood by a person of ordinary skill in the art.

What is claimed is:

1. A flame-retardant compound, comprising:
   at least one moiety derived from muconic acid, having a structure selected from the group consisting of:

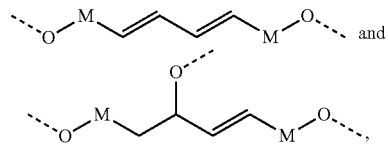

wherein M is a methylene bridge group, and wherein each dotted line represents a covalent bond to a phosphorus atom of a phosphorus-based moiety.

2. The flame-retardant compound of claim 1, wherein the phosphorus-based moiety has a formula selected from a group consisting of:

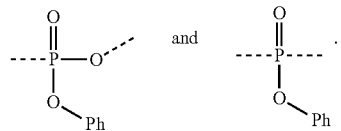

3. The flame-retardant compound of claim 1, wherein the phosphorus-based moiety includes an alkyl substituent and a functional group selected from a group consisting of an epoxy functional group, an allyl functional group, and a propylene carbonate functional group.

4. The flame-retardant compound of claim 1, wherein the phosphorus-based moiety includes a thioether-linked substituent.

* * * * *